United States Patent
Takeuchi et al.

(10) Patent No.: US 6,562,513 B1
(45) Date of Patent: May 13, 2003

(54) THERMOPOLYMERIZABLE COMPOSITION FOR BATTERY USE

(75) Inventors: Masataka Takeuchi, Chiba (JP); Shuichi Naijo, Chiba (JP)

(73) Assignee: Showa Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,155

(22) Filed: Sep. 8, 1999

(30) Foreign Application Priority Data

Sep. 17, 1998 (JP) .......................................... 10-263203

(51) Int. Cl.⁷ ........................ H01M 10/40; H01M 6/18; C08F 4/32
(52) U.S. Cl. ...................... 429/189; 429/314; 429/317; 526/230.5; 526/227; 526/310
(58) Field of Search ................................ 429/189, 317, 429/314; 526/230.5, 227, 310

(56) References Cited

U.S. PATENT DOCUMENTS

| 4,908,283 | A | 3/1990 | Takahashi et al. |
| 5,194,490 | A | 3/1993 | Suga et al. |
| 5,548,046 | A | 8/1996 | Sanchez |
| 5,580,682 | A | 12/1996 | Chaloner-Gill |
| 5,597,661 | A | 1/1997 | Takeuchi et al. |
| 5,597,662 | A | 1/1997 | Isaacson et al. |
| 6,190,805 | B1 * | 2/2001 | Takeuchi et al. ............ 429/307 |

FOREIGN PATENT DOCUMENTS

| JP | 4-253771 | 9/1992 |
| JP | 6-187822 | 7/1994 |
| JP | 9-073907 | 3/1997 |

* cited by examiner

*Primary Examiner*—John S. Maples
(74) *Attorney, Agent, or Firm*—Sughrue Mion, PLLC

(57) ABSTRACT

The present invention provides (1) a thermopolymerizable composition containing a thermopolymerizable compound having (meth)acrylate having a moiety consisting of oxyalkylene, fluorocarbon, oxyfluorocarbon and/or carbonate group within the molecule, an electrolyte salt, an organic polymerization initiator having no benzene ring, and a polymerization retarder having vinyl group within the molecule, (2) a solid electrolyte obtained by heat-curing the composition, (3) a primary battery, a secondary battery and an electric double-layer capacitor each using the solid electrolyte, and processes for manufacturing the same.

18 Claims, 1 Drawing Sheet

THERMOPOLYMERIZABLE COMPOSITION FOR BATTERY USE

TECHNICAL FIELD

The present invention relates to a thermopolymerizable composition for obtaining a highly ion-conductive solid polymer electrolyte, a solid polymer electrolyte obtained by polymerizing the thermopolymerizable composition, a battery and an electric double-layer capacitor using the solid polymer electrolyte, and processes for manufacturing the same.

BACKGROUND ART

In view of the trend of downsizing and desire to eliminate non-solid components in the field of ionics, demand has increased for commercial use of solid-state primary or secondary batteries and electric double-layer capacitors using solid electrolytes as a new ionic conductor rather than the conventional electrolytic solutions.

More specifically, in conventional batteries with electrolytic solutions, leakage of the electrolyte solution or elution of the electrode substance outside the battery is likely to occur, which presents a problem in long-term reliability.

Electric double-layer capacitors using a carbon material having a large specific surface area as the polarizable electrodes and disposing an ionic conducting solution therebetween also have problems in long-term use and reliability because as long as the capacitor uses an existing electrolytic solution, leakage of the solution outside the capacitor is likely to occur during the use for a long period of time or when a high voltage is applied. Electric double-layer capacitors using conventional inorganic ionic conducting substances additionally have a problem that the decomposition voltage of the ionic conducting substances is low and the output voltage is low.

On the other hand, batteries and electric double-layer capacitors using a solid polymer electrolyte are free of problems such as leakage of the solution or elution of the electrode substance and can be processed into various forms or easily be sealed. Also, these can be easily reduced in the thickness. Furthermore, it is reported that in the case of an electric double-layer capacitor using a polyphosphagen-based organic polymer as the main component of ionic conducting substance, the output voltage is high as compared with those using an inorganic ionic conducting substance (see, for example, JP-A-4-253771 (the term "JP-A" as used herein means an "unexamined published Japanese patent application")).

Studies of solid polymer electrolytes in general have succeeded in improving the ionic conductivity to approximately from $10^{-4}$ to $10^{-5}$ S/cm at room temperature, however, this is still low by more than two orders of magnitude as compared with that of liquid ionic conducting substances. The same applies to solid polymer electrolytes having introduced thereinto an oligo-oxyethylene chain, which are being taken notice of in recent years (see, for example, U.S. Pat. No. 5,194,490). Furthermore, there is a problem that at low temperatures of 0° C. or less, the ionic conductivity generally decreases to an extreme extent.

For installing a solid polymer electrolyte into a battery or electric double-layer capacitor, a method of using an electrolyte and a polymerizable compound as the main components of solid polymer electrolyte, loading these into a battery or capacitor structure body in the form of liquid or gel and compounding them by curing, is being studied.

For curing the polymerizable composition, curing methods using active rays are heretofore being aggressively studied and investigated. However, in view of the construction of battery, it is difficult to simultaneously compound and integrate respective elements of positive electrode, negative electrode and/or separator, with the polymerizable composition for solid polymer electrolyte by the irradiation of light. Particularly, in the case where a positive electrode, a solid polymer electrolyte and a negative electrode are stacked or rolled up, each element does not transmit light and therefore, they are difficult to integrate. Furthermore, the polymerizable composition is prone to oxygen inhibition by the contacting air and this disadvantageously gives rise to curing failure.

A method by heat curing is also proposed, in which respective elements of positive electrode, negative electrode and/or separator, and the solid polymer electrolyte may be cured and at the same time, compounded and integrated, and the internal impedance of the battery can be reduced. This method is superior for a type having difficulties in the curing by active rays, that is, a type where a positive electrode, a solid polymer electrolyte and a negative electrode are stacked or rolled up. However, in the case of a polymerizable composition for solid polymer electrolyte using a thermopolymerization initiator, the initiator is mostly determined by the desired curing temperature, therefore, for example, when the electrolytic solution contains a low boiling point solvent, use of initiators having radical generation at high temperatures is limited so as not to cause changes in the solution composition due to volatilization of the solvent. To cope with this problem, a polymerization accelerator is used in combination so that curing at a temperature of from room temperature to a medium temperature (about 80° C.) can be performed. The polymerization accelerator or decomposition products thereof, however, deteriorates the current properties such as ionic conductivity of the solid polymer electrolyte or the properties such as cycle life. If the curing is performed only by heating without using any polymerization accelerator, due to dependency of the curing rate on the thermal decomposition rate of the thermopolymerization initiator, it takes a long time to reach the curing when the temperature is low. It is a common technique to increase the amount of the polymerization initiator or radicals generated so as to efficiently perform curing. However, the amount of unreacted initiator or decomposition products increases, and these disadvantageously have adverse effects on the current properties such as ionic conductivity or electrochemical properties such as cyclability.

As such, if the curability of the thermopolymerizable composition is increased by using an initiator or accelerator having high initiation efficient at low or medium temperatures or by increasing the amount of polymerization initiator, there arises a problem in the storage stability such as gelation of the thermopolymerizable composition, increase in viscosity, etc. accordingly, a polymerizable composition for solid polymer electrolyte, having good heat curability and excellent storage stability is being keenly demanded.

OBJECT OF THE INVENTION

An object of the present invention is to provide a thermopolymerizable composition for a solid polymer electrolyte having excellent ionic conductivity at room temperature and also at low temperatures and having sufficient strength, said thermopolymerizable composition having good curability, excellent storage stability and high practicability in which a polymerization initiator having good thermopolymerization initiating ability and a polymerizable compound having good curability are combined and a specific polymerization retarder is used to prolong the duration of possible use of the thermopolymerizable composition.

Also, an object of the present invention is to provide a solid polymer electrolyte having high ionic conductivity and good stability, comprising an electrolyte and a polymer having a cross-linked and/or side chain structure obtained from the above-described thermopolymerizable composition.

Another object of the present invention is to provide a primary battery and a secondary battery, capable of working at high capacity and high current, having long life and high reliability, and being produced at a low cost, in which the above-described solid polymer electrolyte is used inside the battery.

Still another object of the present invention is to provide an electric double-layer capacitor with a high output voltage, a large takeout current, good processability, long life, excellent reliability and profitability in the production, in which the above-described solid polymer electrolyte is used inside the capacitor.

SUMMARY OF THE INVENTION

As a result of extensive investigations to attain the above-described objects, the present inventors have found that the compound having a specific structure represented by the following formula (1) has a polymerization retarding effect and thereby improves storage stability of a thermopolymerizable composition:

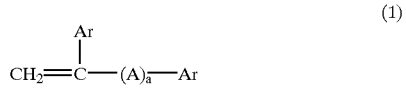
(1)

(wherein the symbols have the same meanings as defined later).

Furthermore, by combining a thermopolymerization initiator comprising a specific organic peroxide represented by the following formula (2) and a polymerizable compound having a specific structure represented by the following formula (3) or (4), a thermopolymerizable composition having good storage stability and excellent curing property can be obtained. It is verified that this composition produces a solid polymer electrolyte even in the inside of an electrode or in the inside of a material, where active rays cannot reach, and the solid polymer electrolyte obtained has good adhesion to the electrode.

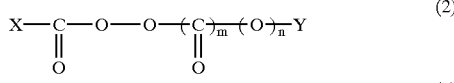
(2)

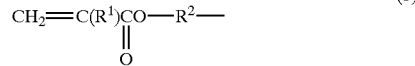
(3)

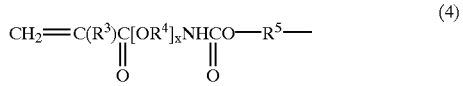
(4)

(wherein the symbols have the same meanings as defined later).

A solid polymer electrolyte obtained starting from a urethane (meth)acrylate compound, which has been previously proposed by the present inventors (JP-A-9-73907) exhibits excellent ionic conductivity at room temperature and also at low temperatures and when this is used as the above-described polymerizable compound, the composition and in turn the solid polymer electrolyte can exhibit excellent ionic conductivity at room temperature and also at low temperatures. This is also verified.

More specifically, the present invention relates to a thermopolymerizable composition described below, a solid polymer electrolyte obtained by polymerizing the thermopolymerizable composition, a battery and an electric double-layer capacitor each using the solid polymer electrolyte, and processes for manufacturing the same.

(1) A thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

(2) The thermopolymerizable composition as described in (1) above, wherein said polymerization retarder is a compound having a structure represented by the following formula (1):

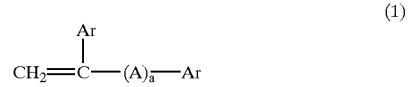
(1)

wherein A represents a linear, branched or cyclic alkylene group having from 1 to 20 carbon atoms, a linear, branched or cyclic alkenyl group having from 2 to 20 carbon atoms or a linear, branched or cyclic alkynyl group having from 2 to 20 carbon atoms; Ar represents an aryl group which may have a substituent; a represents an integer of 0 or 1; and two Ar groups may the same or different.

(3) The thermopolymerizable composition as described in (1) above, wherein said polymerization retarder is a compound having a structure represented by formula (1) where A is a linear, branched or cyclic alkylene group having from 1 to 20 carbon atoms; Ar is a phenyl group which may have a substituent; a is an integer of 0 or 1; and two Ar groups may be the same or different.

(4) The thermopolymerizable composition as described in (1) above, wherein said polymerization initiator is an organic peroxide represented by the following formula (2):

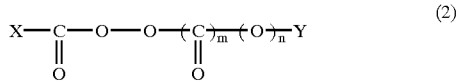
(2)

wherein X represents a linear, branched or cyclic alkyl or alkoxy group which may have a substituent; Y represents a linear, branched or cyclic alkyl group which may have a substituent; and m and n each independently represents 0 or 1, provided that the combination of (m,n)=(0,1) is excluded.

(5) The thermopolymerizable composition as described in (1) above, wherein said polymerization initiator is an organic peroxide represented by formula (2) where X and Y each is a linear, branched or cyclic alkyl group which may have a substituent; and m and n each independently is 0 or 1, provided that the combination of (m,n)=(0,1) is excluded.

(6) The thermopolymerizable composition as described in (4) above, wherein said organic peroxide has an active oxygen amount of from about 1 to about 1,000 ppm based on the thermopolymerizable composition.

(7) The thermopolymerizable composition as described in (4) above, wherein said organic peroxide is selected from the group consisting of diacyl peroxides, peroxydicarbonates and peroxy esters each containing no benzene ring.

(8) The thermopolymerizable composition as described in (1) above, wherein said thermopolymerizable compound comprises a compound having an ethylenically unsaturated polymerizable group.

(9) The thermopolymerizable composition as described in (1) above, wherein said thermopolymerizable compound comprises a polymerizable compound having either one of the polymerizable functional groups represented by the following formulae (3) and/or (4):

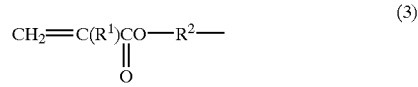

(3)

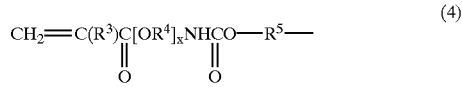

(4)

wherein $R^1$ and $R^3$ each represents hydrogen atom or an alkyl group; $R^2$ and $R^5$ each represents a divalent group containing oxyalkylene, fluorocarbon, oxyfluorocarbon or a carbonate group; $R^4$ represents a divalent group having 10 or less carbon atoms; provided that $R^2$, $R^4$ and $R^5$ each may contain a hetero atom and may have any of linear, branched and cyclic structures; x represents 0 or an integer of from 1 to 10; provided that when a plurality of polymerizable functional groups represented by formula (3) or (4) are contained in the same molecule, $R^1$, $R^2$, $R^3$, $R^4$, $R^5$ or x in each polymerizable functional group may be the same or different.

(10) The thermopolymerizable composition as described in (9) above, which further comprises at least one organic solvent selected from the group consisting of carbonic esters, aliphatic esters, ethers, lactones, sulfoxides and amides.

(11) The thermopolymerizable composition as described in (1) above, wherein the content of said organic solvent is from about 300 to about 1,500 wt % based on the thermopolymerizable compound.

(12) The thermopolymerizable composition as described in (1) above, which comprises at least one kind of inorganic fine particle having an average particle size of from about 0.005 to about 100 µm.

(13) The thermopolymerizable composition as described in (1) above, wherein said electrolyte salt is at least one selected from the group consisting of alkali metal salts, quaternary ammonium salts, quaternary phosphonium salts, transition metal salts and protonic acids.

(14) The thermopolymerizable composition as described in (13) above, wherein at least one electrolyte salt is selected from the group consisting of $LiPF_6$, $LiBF_4$, $LiAsF_6$ and $LiN(R-SO_2)_2$ (wherein R represents a perfluoro-alkyl group having from 1 to 10 carbon atoms).

(15) A solid polymer electrolyte obtained by thermopolymerizing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

(16) An electrode for batteries or electric double-layer capacitors, comprising an electroactive substance or a polarizable material and a solid polymer electrolyte obtained by thermopolymerizing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

(17) A battery using a solid polymer electrolyte obtained by thermopolymerizing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

(18) The battery as described in (17) above, wherein at least one material selected from the group consisting of lithium, lithium alloys, carbon materials capable of occluding or releasing lithium ion, inorganic compounds capable of occluding or releasing lithium ion and electrically conducting polymers capable of occluding or releasing lithium ion is used as the negative electrode of the battery.

(19) The battery as described in (17) above, wherein at least one material selected from the group consisting of electrically conducting polymers, metal oxides, metal sulfides and carbon materials is used as the positive electrode of the battery.

(20) An electric double-layer capacitor comprising a solid polymer electrolyte obtained by thermopolymerizing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

(21) A process for manufacturing a battery, comprising placing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group, in a structure body for constructing a battery, or disposing the composition on a support, and then heat-curing the thermopolymerizable composition.

(22) A process for manufacturing an electric double-layer capacitor, comprising placing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group, in a structure body for constructing an electric double-layer capacitor, or disposing the composition on a support, and then heat-curing the thermopolymerizable composition.

Figure 1:
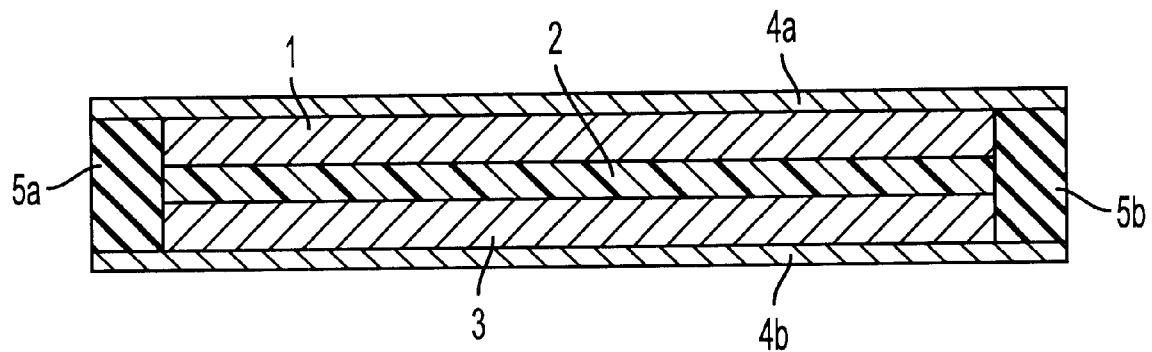
FIG. 1 shows a schematic cross-sectional view of a thin solid-state battery as one example of the battery according to the present invention.

DETAILED DESCRIPTION OF THE INVENTION (A) Thermopolymerizable Composition

The thermopolymerizable composition of the present invention essentially comprises at least one each of (a)

thermopolymerizable compounds, (b) polymerization initiators, (c) polymerization retarders and (d) electrolyte salts. The thermopolymerizable composition may further comprise (e) organic solvents and (f) inorganic fine particles.

The thermopolymerizable composition of the present invention is characterized particularly by the specific polymerization retarder (c) added for improving storage stability.

In a preferred embodiment, a specific polymerization initiator (b) having good polymerization initiating ability may be combined with (c), so that a thermopolymerizable composition having good curability and excellent storage stability can be obtained. More specifically, (b) the polymerization initiator represented by formula (2) has good polymerization initiating ability and by virtue of this, the reaction can efficiently proceed even with a very small amount, the thermopolymerizable composition can be cured even at a temperature of from room temperature to a medium temperature, and the residual double bond can be greatly reduced, so that a thermopolymerizable composition having good curing property can be obtained.

However, the use of (b) the polymerization initiator represented by formula (2) incurs a problem that the storage stability of thermopolymerizable composition deteriorates and accidental curing of the thermopolymerizable composition is liable to occur. But, when a specific polymerization retarder (c) represented by formula (1) is added thereto, the storage stability is peculiarly improved.

This polymerization retarder represented by formula (1) is a composition having a double bond of a styrene skeleton and has a function of adding to the double bond growing radicals gradually generated by the decomposition or the like of the polymerization initiator during the storage of the thermopolymerizable composition. The polymerization retarder having added thereto this radical is stable for a long period of time and can prevent the accidental polymerization of the thermopolymerizable composition.

In addition, a specific compound having a polymerizable functional group represented by formula (3) and/or (4) is preferably used as the thermopolymerizable compound (a) because the thermopolymerizable composition is more improved in curing properties. The cured product obtained using this specific thermopolymerizable compound (a) forms an electrochemically stable solid polymer electrolyte which is excellent in the electric current property and the cyclability. Furthermore, surprisingly, when the composition contains an organic solvent, good curability can be attained even if the organic solvent exceeds about 300 wt % of the polymerizable compound, and the solid polymer electrolyte obtained is high ionic conductive and has excellent film-forming property, suitable film strength and good electrochemical properties.

The constituent components of the thermopolymerizable composition of the present invention are described in detail below.

(a) Thermopolymerizable Compound (i) Structure of Thermopolymerizable Compound The thermopolymerizable compound (a) for use in the present invention is not particularly limited, however, a polymerizable compound having either one of the functional groups represented by the following formulae (3) and/or (4) is preferred:

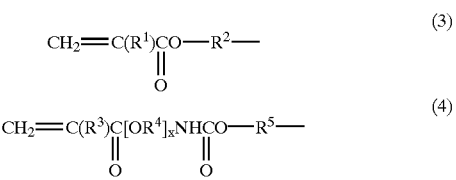

wherein $R^1$ and $R^3$ each represents hydrogen atom or an alkyl group; $R^2$ and $R^5$ each represents a divalent group containing oxyalkylene, fluorocarbon, oxyfluorocarbon or a carbonate group; $R^4$ represents a divalent group having 10 or less carbon atoms; provided that $R^2$, $R^4$ and $R^5$ each may contain a hetero atom and may have any of linear, branched and cyclic structures; x represents 0 or an integer of from 1 to 10, provided that when a plurality of polymerizable functional groups represented by formula (3) or (4) are contained in the same molecule, $R^1$, $R^2$, $R^3$, $R^4$, $R^5$ or x in each polymerizable functional group may be the same or different.

The polymerizable compound having either one of the functional groups represented by formulae (3) and (4) comprises a (meth)acrylate structure and a moiety containing oxyalkylene, fluorocarbon, oxyfluorocarbon and/or a carbonate group. The (meth)acrylate structure forms a cross-link or main chain by the polymerization reaction. The moiety comprising oxyalkylene, fluorocarbon, oxyfluorocarbon or a carbonate group forms a cross-linked and/or side chain structure after the polymerization. In this side chain structure and the like, a hetero atom accelerates the ionization of electrolyte salt to improve the ionic conductivity of solid electrolyte and at the same time, accelerates curing by the radical polymerization. As a result, it has been found that even with a small amount of thermopolymerization initiator added, the residual double bond is greatly reduced and the curing completely proceeds.

In particular, a polymerizable functional group having a structure represented by formula (4) is preferred. In the case where the thermopolymerizable compound has a polymerizable functional group of formula (4), the polymer obtained by polymerizing the compound contains a urethane group, therefore, the dielectric constant is high and when a solid polymer electrolyte is formed, the ionic conductivity is advantageously high. Furthermore, the thermopolymerizable compound containing a structure represented by formula (4) has good polymerizability and when the compound is formed into a thin film, high film strength and sufficient inclusion of electrolytic solution are advantageously attained.

The oxyalkylene contained in $R^2$ of formula (3) or $R^5$ of formula (4) is not particularly limited but preferably an oxyalkylene chain containing a structure represented by the following formula:

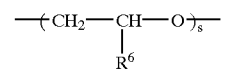

wherein $R^6$ represents hydrogen atom or an alkyl side chain having 10 or less carbon atoms and the alkyl side chain is preferably a methyl group; the repetition number s is an integer of from 1 to 1,000, preferably from 1 to 50; and $R^6$ may be different among respective repeating units.

The fluorocarbon contained in $R^2$ of formula (3) or $R^5$ of formula (4) is not particularly limited but preferably an alkylene chain having 20 or less carbon atoms in which the hydrogen bonded to carbon is replaced by fluorine. The carbon chain skeleton may have any of linear, branched and cyclic structures.

The oxyfluorocarbon contained in $R^2$ of formula (3) or $R^5$ of formula (4) is not particularly limited but preferably an oxyfluorocarbon chain containing a structure represented by the following formula:

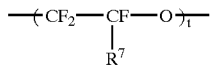

wherein $R^7$ represents fluorine atom or a fluorocarbon side chain having 10 or less carbon atoms and the fluorocarbon side chain is preferably a perfluoromethyl group; the repetition number t is an integer of from 1 to 1,000, preferably from 1 to 50; and $R^7$ may be different among respective repeating units.

The carbonate group contained in $R^2$ of formula (3) or $R^5$ of formula (4) is not particularly limited but preferably a poly- or oligo-carbonate chain represented by the following formula:

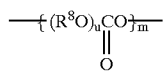

wherein $R^8$ represents a linear, branched and/or cyclic divalent group having from 1 to 10 carbon atoms, which may contain a hetero atom; u is an integer of from 1 to 10; and w is an integer of from 2 to 1,000.

In the formula above, if u exceeds 10, the carbonate group in the polymer compound is reduced and the dielectric constant decreases, as a result, the electrolyte salt is disadvantageously difficult to dissociate. u is preferably an integer of from 1 to 5.

In the formula above, if the carbon number of $R^8$ is excessively large, the carbonate group in the polymer compound is reduced and the dielectric constant decreases, as a result, the electrolyte salt is disadvantageously difficult to dissociate. Moreover, the polymer compound is increased in the hydrophobicity and reduced in the compatibility with various polar solvents. The carbon number of $R^8$ is preferably from 1 to 6, more preferably from 1 to 4. The repetition number w is an integer of from 2 to 1,000, preferably from 3 to 100, more preferably from 5 to 50.

The remaining moiety other than $R^2$ in formula (3) or $R^5$ in formula (4) may contain any of linear, branched and cyclic structures and may also contain a hetero atom as long as the object of the present invention is not inhibited.

In formula (4), $R^4$ is preferably

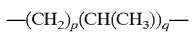

wherein p and q each represents 0 or an integer of from 1 to 5, provided that when p=q=0, x is 0 and when x in the moiety of $(OR^4)_x$ is 2 or more, —$CH_2$— and —$CH(CH_3)$— may be irregularly arrayed without continuing.

(ii) Production Method of Thermopolymerizable Compound

The method for synthesizing the compound having a functional group represented by formula (3) is not particularly limited. However, for example, when $R^2$ is an oxyalkylene group, the compound may be easily obtained by reacting an acid chloride and an oligo-oxyalkylene-ol having a hydroxyl group at the terminal.

For example, the compound having one functional group represented by formula (3) may be easily obtained by reacting an acid chloride and a monoalkyl oligo-alkylene-glycol at a molar ratio of 1:1 according to the following reaction scheme:

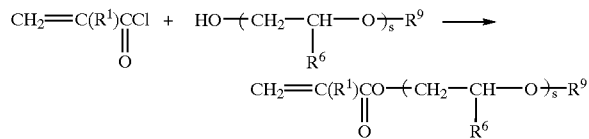

(wherein $R^1$ has the same meaning as in formula (3); $R^6$ and s have the same meanings as defined above; and $R^9$ represents a group incapable of reacting with an acid chloride, such as an alkyl group).

Similarly, the compound having two functional groups represented by formula (3) may be easily obtained by reacting an acid chloride and an oligo-alkylene-glycol at a molar ratio of 2:1 according to the following reaction scheme:

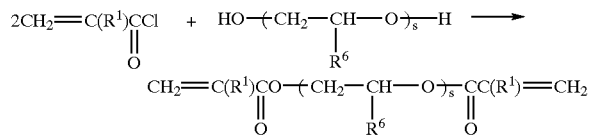

(wherein $R^1$, $R^6$ and s have the same meanings as defined above).

The same applies to compounds having three or more functional groups of formula (3). That is, by reacting an acid chloride with a triol such as glycerin, a tetraol such as pentaerythritol, a pentaol obtained by the addition polymerization of alkylene oxide to α-D-glucopyranose or a hexaol obtained by the addition polymerization of alkylene oxide to mannitol at a molar ratio of 3:1, 4:1, 5:1 or 6:1, respectively, polymerizable compounds of formula (1) having 3, 4, 5 or 6 functional groups within one molecule may be obtained.

The production method of a compound where $R^2$ contains oxyfluorocarbon is the same as above except for using oxyfluorocarbon in which the hydrogen bonded to the carbon skeleton of a compound having a hydroxyl group is replaced by fluorine.

As the specific method, the compound having one ethylenically unsaturated group, namely, the compound having one unit represented by formula (1) may be easily obtained, for example, by reacting the above-described acid chloride with a mono-ol such as 2,2,3,3,4,4,4-heptafluoro-1-butanol at a molar ratio of 1:1.

Similarly, the compound having two ethylenically unsaturated groups, namely, the compound having 2 units represented by formula (3) may be easily obtained, for example, by reacting an acid chloride with a di-ol such as 2,2,3,3-tetrafluoro-1,4-butanediol at a molar ratio of 2:1.

The same applies to compounds having 3 or more units represented by formula (3).

The method for synthesizing the compound having a functional group containing an oxyalkelyene group and represented by formula (4), for use in the solid polymer electrolyte of the present invention is not particularly limited, however, the compound may be easily obtained, for example, by reacting an isocyanate compound represented by the formula:

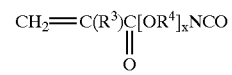

(wherein $R^3$, $R^4$ and x have the same meanings as in formula (4)) in place of the above-described acid chloride with an oligo-oxyalkylene-ol having a hydroxyl group at the terminal.

As the specific method, the compound having one functional group represented by formula (4) may be easily obtained, for example, by reacting a methacryloyl isocyanate-based compound (hereinafter simply referred to as "MI") or an acryloyl isocyanate-based compound (hereinafter simply referred to as "AI") with a monoalkyl oligo-alkylene-glycol or the like at a molar ratio of 1:1 according to the following reaction scheme:

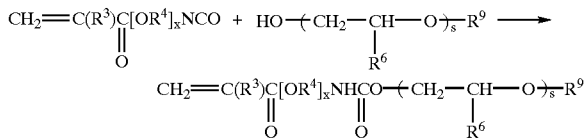

(wherein $R^3$, $R^4$, $R^6$, $R^9$, x and s have the same meanings as defined above).

Also, the compound having 2 or more functional groups represented by formula (4) may be similarly synthesized. For example, the compound having 2 functional groups represented by formula (4) may be obtained by reacting MI or AI with an oligo-alkylene-glycol at a molar ratio of 2:1, the compound having 3 functional groups represented by formula (4) may be obtained by reacting MI and/or AI with a tri-ol obtained by the addition polymerization of an alkylene oxide to a trihydric alcohol such as glycerin, at a molar ratio of 3:1, the compound having 4 or more functional groups represented by formula (4) may be obtained by reacting MI and/or AI with a tetra-ol obtained by the addition polymerization of an alkylene oxide to a tetrahydric alcohol such as pentaerythritol, at a molar ratio of 4:1, the compound having 5 functional groups represented by formula (4) may be obtained by reacting MI and/or AI with a penta-ol obtained by the addition polymerization of an alkylene oxide to α-D-glucopyranose, at a molar ratio of 5:1, or the compound having 6 functional groups represented by formula (4) may be obtained by reacting MI and/or AI with a hexa-ol obtained by the addition polymerization of an alkylene oxide to mannitol, at a molar ratio of 6:1.

For introducing fluorocarbon or oxyfluorocarbon in place of oxyalkylene, this may be attained by replacing the hydrogen in the dihydric or greater hydric alcohol used above with fluorine. For example, a thermopolymerizable compound containing 2 functional groups represented by formula (4) within the molecule, bonded through perfluorocarbon, may be obtained by reacting MI or AI with a di-ol such as 2,2,3,3-tetrafluoro-1,4-butanediol at a molar ratio of 2:1 according to the following reaction scheme:

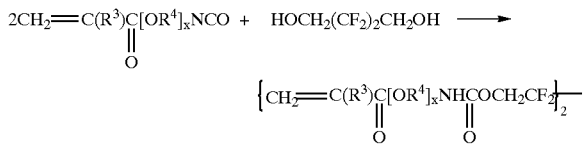

The same applies to compounds having 3 or more units represented by formula (4).

The polymerizable compound where $R^2$ or $R^5$ is a group containing a carbonate group specifically includes, for example, compounds represented by the following formulae:

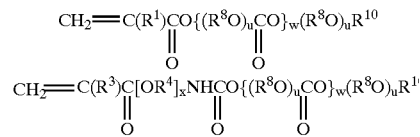

wherein $R^{10}$ represents a linear, branched and/or cyclic group having from 1 to 20 carbon atoms, which may contain a hetero atom, and other symbols have the same meanings as defined above.

The method for synthesizing a polymerizable compound having a functional group represented by formula (3) where $R^2$ is a group containing a carbonate group. However, the compound may be easily obtained, for example, by reacting an acid chloride with a poly- or oligo-carbonate-ol having a hydroxyl group at the terminal according to the following scheme:

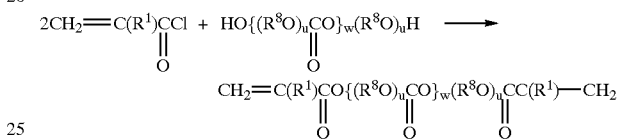

wherein $R^1$, $R^8$, u and w have the same meanings as defined above.

The method for synthesizing a polymerizable compound having a functional group represented by formula (4) where $R^5$ is a group containing a carbonate group is not particularly limited. However, the compound may be easily obtained, for example, by reacting an isocyanate compound represented by the formula:

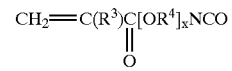

with a poly- or oligo-carbonate-ol.

As the specific method, the compound having one functional group represented by formula (2) may be easily obtained, for example, by reacting MI or AI with a monoalkyl poly- or oligo-carbonate-ol at a molar ratio of 1:1 as in the following scheme:

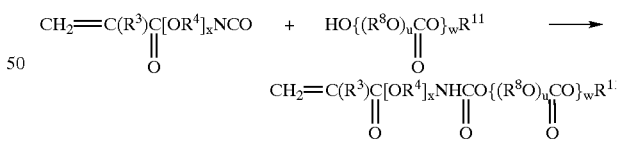

wherein $R^{11}$ represents a linear, branched and/or cyclic group having from 1 to 10 carbon atoms, which may contain a hetero atom, and $R^3$, $R^4$, $R^8$, u, w and x have the same meanings as defined above.

The compound having 2 functional groups represented by formula (4) may be easily obtained, for example, by reacting MI or AI with a poly- or oligo-carbonate-ol at a molar ratio of 2:1 as follows:

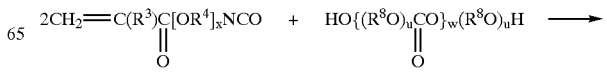

-continued

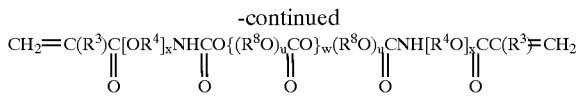

wherein $R^3$, $R^4$, $R^8$, u, w and x have the same meanings as defined above.

The compound having 3 functional groups represented by formula (2) may be easily obtained, for example, by reacting MI or AI with an oligo-carbonate-tri-ol at a molar ratio of 3:1.

(iii) Form of Thermopolymerizable Compound on Use

The thermopolymerizable compound for use in the present invention is polymerized by heating in the presence of a polymerization initiator which is described later, to form a solid polymer electrolyte. The compounds having a polymerizable functional group represented by formula (3) and/ or (4) may be used either individually or in combination of two or more thereof. It is also possible to use at least one of the polymerizable compounds having a polymerizable functional group represented by formula (3) and/or (4) in combination with other polymerizable compound.

The polymer formed by polymerizing the compound having only functional group represented by formula (3) or (4) has no cross-linked structure and therefore, the film strength thereof is deficient. If the polymer is formed into a thin film and used as an electrolyte membrane, the electrolyte membrane is sometimes short-circuited. Accordingly, the polymer is preferably copolymerized and crosslinked with a polymerizable compound having 2 or more functional groups represented by formula (3) and/or (4), or used in combination of a polymer obtained from a polymerizable compound having 2 or more functional groups represented by formula (3) and/or (4). In the case of using such a polymer as a thin film, the number of functional groups represented by formula (3) or (4) contained in one molecule is preferably 3 or more taking account of the film strength.

The other polymerizable compound copolymerizable with the polymerizable compound having a polymerizable functional group represented by formula (3) and/or (4) is not particularly limited, however, examples thereof include (meth)acrylic acid alkyl esters such as methyl methacrylate and n-butyl acrylate; various urethane acrylates; (meth) acrylamide-based compounds such as acrylamide, methacrylamide, N,N-dimethylacrylamide, N,N-dimethylmethacrylamide, (meth)acryloyl carbonate, N-vinylpyrrolidone, acyloylmorpholine, methacryloylmorpholine and N,N-dimethylaminopropyl(meth)acrylamide; styrene-based compounds such as styrene and α-methylstyrene; N-vinylamide-based compounds such as N-vinylacetamide and N-vinylformamide; and alkyl vinyl ethers such as ethyl vinyl ether. Among these, (meth)acrylic acid ester and urethane (meth)acrylate are preferred, and urethane (meth)acrylate is more preferred in view of polymerizability.

(b) Thermopolymerization Initiator

The thermopolymerization initiator is roughly classified into a system of causing homolysis by the heat to generate a radical, and a binary system of causing one-electron transfer reaction between two substances to generate a radical. Examples of the former include peroxides such as benzoyl peroxide, and azo compounds such as azobisisobutyronitirile. Examples of the latter include redox initiators.

In the present invention, an organic peroxide represented by formula (2) is preferably used:

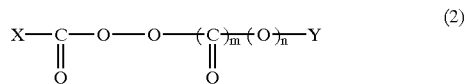

wherein X represents a linear, branched or cyclic alkyl or alkoxy group which may have a substituent; Y represents a linear, branched or cyclic alkyl group which may have a substituent; and m and n each independently represents 0 or 1, provided that a combination of (m,n)=(0,1) is excluded.

An azo compound such as azobisdiphenylmethane, 2,2'-azobisisobutyronitrile and dimethyl-2,2'-azobis(2-methylpropionate) generates gas accompanying the generation of radical. In the case of compounding a solid electrolyte on an electrode and/or inside an electrode, this gas disadvantageously causes change in the battery shape such as stripping of electrode material or expansion of electrode, or adversely affects the current properties or the electrochemical properties such as increase in the interfacial resistance or deterioration of the cyclability. Therefore, the azobis compound is not preferred.

A peroxide having a benzene ring, for example, a benzoin-based compound such as benzoin isobutyl ether, an acetophenone-based compound such as diethoxyacetophenone, and a benzophenone-based compound such as benzophenone and methyl benzoylbenzoate, has a problem in the electrochemical stability because the thermal decomposition products thereof contain a phenyl group and also, the cyclability of a battery manufactured rapidly deteriorates. Furthermore, the temperature for halving the active oxygen amount of benzene ring-containing peroxides in general is high, therefore, deterioration or decomposition of electrolyte, solvent or polymer, or volatilization of solvent readily takes place to cause a problem in the electrochemical properties or in the process for manufacturing. Thus, the peroxide having a benzene ring is not preferred.

On the other hand, the polymerization initiator represented by formula (2) has good polymerization initiating ability and even with a very small amount, the reaction can efficiently proceed and even at a temperature of from room temperature to a medium temperature, the thermopolymerizable composition can be cured. As a result, a thermopolymerizable composition having good curing property suitable for obtaining a solid polymer electrolyte greatly reduced in the residual double bond can be obtained. Furthermore, the thermopolymerizable composition using this polymerization initiator scarcely generates gas at the curing and the product after the curing is electrochemically stable. Therefore, the solid polymer electrolyte obtained from this thermopolymerizable composition is verified to be free of electrochemical problems such as reduction in the current properties or deterioration in the cyclability, or not to cause increase in the internal impedance accompanying gas generation, such as stripping of an electrode from the collector or stripping of a solid polymer electrolyte from the electrode.

The organic peroxide as the polymerization initiator represented by formula (2) is diacyl peroxides, peroxy dicarbonates or peroxy esters. Preferred examples thereof include 3,5,5-trimethylhexanoyl peroxide, lauroyl peroxide, stearoyl peroxide, octanoyl peroxide, di-n-propylperoxy dicarbonate, diisopropylperoxy dicarbonate, bis(4-t-butylcyclohexyl) peroxy dicarbonate, di-2-ethoxyethylperoxy dicarbonate, di-2-ethylhexylperoxy dicarbonate, di-2-methoxybutylperoxy dicarbonate, di(3-methyl-3-methoxybutyl)peroxy dicarbonate, 1,1,3,3- tetramethylbutylperoxy neodecanate, 1-cyclohexyl-1-methylethylperoxy neodecanate, t-hexylperoxy neodecanate, t-butylperoxy neodecanate, t-hexylperoxy pivalate, t-butylperoxy pivalate, 1,1,3,3-tetramethylbutylperoxy-2-ethyl hexanoate, 1-cyclohexyl-1-methylethylperoxy-2-ethyl hexanoate and t-hexylperoxy-2-ethyl hexanoate. The organic peroxide is more preferably diacyl peroxide or peroxy ester. Specific examples thereof include 3,5,5-trimethylhexanoyl peroxide, lauroyl peroxide, stearoyl peroxide, octanoyl peroxide, 1,1,3,3-tetramethylbutylperoxy neodecanate, 1-cyclohexyl-1-methylethylperoxy neodecanate, t-hexylperoxy neodecanate, t-butylperoxy neodecanate, t-hexylperoxy pivalate, 1,1,3,3-tetramethylbutylperoxy-2-ethyl hexanoate, 1-cyclohexyl-1-methylethylperoxy-2-ethyl hexanoate and t-hexylperoxy-2-ethyl hexanoate.

These organic peroxides may be used individually or in any combination in the present invention. Two or more thereof may also be used.

In curing a polymerizable compound and/or a polymerizable composition, the curing is preferably performed at a temperature of from room temperature to a medium temperature in view of heat stability of the solid polymer electrolyte produced or adhesion in the compounding with various constituent materials such as electrode. In the case where curing at from room temperature to a medium temperature is intended, it is possible to use an initiator and a reducing accelerator in combination or to decompose the initiator only by heat. An initiator which causes cleavage by itself at room temperature or first decomposes by heating to generate free radical and thereby exhibit activity is preferred rather than that which can exhibit activity when used in combination use with an accelerator. In the case of causing curing only by heat, it is sufficient to select an optimal thermal decomposition rate of the initiator. A combination use of such initiators is also preferred.

In the polymerizable composition of the present invention, the active oxygen amount defined by the following formula, namely, a value obtained by dividing the atomic weight of active oxygen (—O—) present in the structure of an organic peroxide by the molecular weight of the organic peroxide and multiplying the resulting value by the wt % (% by weight) of the organic peroxide occupying in the polymerizable composition, is preferably from about 1 ppm to about 1,000 ppm, more preferably from about 10 ppm to about 500 ppm.

Active Oxygen Amount (wt %)=(amount of organic peroxide/amount of polymerizable composition)×(16×number of peroxide bonds/molecular weight of organic peroxide)

If the active oxygen amount is excessively small, the reaction does not satisfactorily proceed, whereas if the active oxygen amount is excessively large, radical termination due to the initiator frequently takes place and a low molecular weight film readily results. This causes problems such as deficient film strength, and adversely affects the current properties or electrochemical properties such as deterioration of the cyclability.

(c) Polymerization Retarder

The polymerization retarder used in the thermopolymerizable composition of the present invention is a compound having a structure represented by the following formula (1) containing a vinyl group within the molecule:

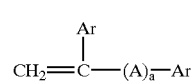

wherein A represents a linear, branched or cyclic alkylene group having from 1 to 20 carbon atoms, a linear, branched or cyclic alkenyl group having from 2 to 20 carbon atoms or a linear, branched or cyclic alkynyl group having from 2 to 20 carbon atoms; Ar represents an aryl group which may have a substituent; a represents an integer of 0 or 1; and two Ar groups may the same or different.

Examples of the linear, branched or cyclic alkylene group represented by A in formula (1) include the groups represented by the following formulae:

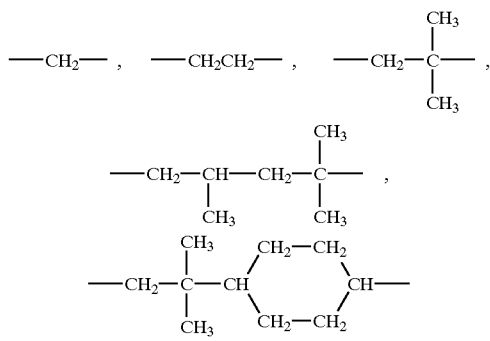

In formula (1), examples of the aryl group include a thiophene ring, a furan ring, a pyridine ring, a triazole ring, a phenyl ring, a naphthalene ring, an anthracene ring, a benzofuran ring, a benzotriazole ring and a benzothiazole ring. Examples of the substituent of the aryl group include an alkyl group such as methyl group and ethyl group; an alkoxy group such as methoxy group and ethoxy group; a dialkylamino group; a nitro group; a halogen atom such as fluorine atom and chlorine atom; and a cyano group. Examples of the aryl group having a substituent include a 4-methyl-1-naphthyl group, a 2,4,6-trimethoxyphenyl group, a 3-methylphenyl group, a 3,5-dimethylphenyl group, a 4-dimethylaminopyridyl group and a 4-fluorophenyl group.

The polymerization retarder for use in the present invention exerts the following functions at the initiation of polymerization of the thermopolymerizable composition of the present invention.

First, the polymerization retarder (c) adds or chain-transfers the primary radical or grown radical generated upon decomposition or the like of the thermopolymerization initiator at the initiation of polymerization, to the vinyl group of this polymerization retarder to temporarily stop the growing reaction and thereby stabilize the system. Subsequently, the polymerization retarder transfers the radical generated at the double bond of the vinyl group to a polymerizable functional group of another polymerizable compound in the thermopolymerizable composition to re-start the radical growing reaction and thereby allow the polymerization reaction to proceed. In general, the polymerization retarder mainly reduces the reaction rate of radical polymerization and the effect as a retarder is determined by the first reactivity with the primary radical or growing radical and the reactivity at the re-starting. Therefore, even the same compound behaves as an inhibitor depending on the kind or composition of the polymerizable composition. However, the polymerization retarder (c) containing a vinyl group functions as a retarder in the thermopolymerizable composition. Specific examples of the compound having such a function include a compound where A in formula (1) is

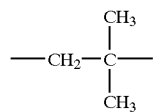

and a is 1, a compound where A is

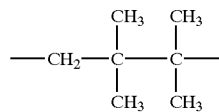

and a is 1, and a compound where A is

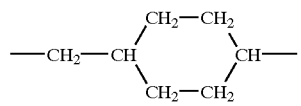

and a is 1.

Although it varies depending on the kind or composition of other components (e.g., polymerization initiator, polymerizable compound, organic solvent) in the thermopolymerizable composition, the polymerization retarder is generally used in an amount of from about 1 ppm to about 1 wt %, preferably from about 10 ppm to about 1 wt %.

(d) Electrolyte Salt

The kind of the electrolyte salt for use in the present invention is not particularly limited and any electrolyte may be used as long as it contains ion intended to be a carrier. The electrolyte salt preferably has a large dissociation constant in a solid polymer electrolyte and examples thereof include alkali metal salts and ammonium salts. Examples of the alkali metal salts include alkali metal salts of trifluoromethanesulfonic acid, such as $LiCF_3SO_3$, $NaCF_3SO_3$ and $KCF_3SO_3$; alkali metal salts of perfluoroalkanesulfonic imide, such as $LiN(CF_3SO_2)_2$ and $LiN(CF_3CF_2SO_2)_2$; alkali metal salts of hexafluorophosphoric acid, such as $LiPF_6$, $NaPF_6$ and $KPF_6$; perchlorate alkali metal salts such as $LiClO_4$ and $NaClO_4$; tetrafluoroborates such as $LiBF_4$ and $NaBF_4$; and alkali metal salts such as LiSCN, $LiAsF_6$, LiI, NaI, $NaAsF_6$ and KI. Examples of the ammonium salt include quaternary ammonium salts of perchloric acid, such as tetraethylammonium perchlorate; quaternary ammonium salts of tetrafluoroboric acid, such as $(C_2H_5)_4NBF_4$; quaternary ammonium salts such as $(C_2H_5)_4NPF_6$; and quaternary phosphonium salts such as $(CH_3)_4P.BF_4$ and $(C_2H_5)_4P.BF_4$. Among these, in view of solubility in an organic solvent and ionic conductivity, $LiPF_6$, $LiBF_4$, $LiAsF_6$, and alkali metal salts and quaternary ammonium salts of perfluoroalkanesulfonic imide are preferred.

The ratio of the polymer component and the electrolyte salt compounded in a solid polymer electrolyte obtained by curing the thermopolymerizable composition of the present invention is preferably such that the electrolyte salt is from 0.1 to 50 wt %, more preferably from 1 to 30 wt %, based on the weight of polymer. If the electrolyte salt is present at a ratio of 50 wt % or more, the ion transfer is greatly inhibited, whereas if it is present at a ratio of less than 0.1 wt %, the absolute amount of ion is deficient and the ion conductivity is low.

(e) Organic Solvent

The solid polymer electrolyte of the present invention preferably contains an organic solvent as the solvent because ionic conductivity of the solid polymer electrolyte is further improved. As the organic solvent which can be used, a compound having good compatibility with the polymerizable compound (a) used in the thermopolymerizable composition for obtaining a solid polymer electrolyte of the present invention, having a large dielectric constant, ensuring high solubility of the electrolyte salt (d) used in the thermopolymerizable composition of the present invention, having a boiling point of 70° C. or more, and being wide in the electrochemically stable range is suitable. In addition, an organic solvent having a low water content is more preferred.

Examples of such a solvent include oligo ethers such as triethylene glycol methyl ether and tetraethylene glycol dimethyl ether; carbonic esters such as ethylene carbonate, propylene carbonate, dimethyl carbonate, diethyl carbonate, ethyl methyl carbonate and vinylene carbonate; aliphatic esters such as methyl propionate and methyl formate; aromatic nitriles such as benzonitrile and tolunitrile; amides such as dimethylformamide; sulfoxides such as dimethylsulfoxide; lactones such as γ-butyrolactone; sulfur compounds such as sulfolane; N-methylpyrrolidone, N-vinylpyrrolidone and phosphoric esters. Among these, carbonic esters, aliphatic esters and ethers are preferred, and carbonates are more preferred. These solvents may be used individually or may be used as a mixed solvent by mixing two or more thereof.

As the organic solvent content is larger, the solid polymer electrolyte obtained is more improved in the ionic conductivity. Accordingly, the organic solvent content is generally larger, however, if the content is excessively large, the curability, the film forming property or the mechanical strength of film may be impaired. The polymerizable composition comprising a combination of a polymerizable compound containing a polymerizable functional group represented by formula (3) and/or (4), and an organic peroxide represented by formula (2), which is a preferred embodiment of the present invention, is characterized by having good curability, excellent film forming property or good mechanical strength of film even when the organic solvent content is increased. Therefore, the organic solvent can be contained in the composition in an amount of about 200 wt % or more based on the weight of the polymerizable compound used in the solid polymer electrolyte. In view of the current properties such as ionic conductivity, the organic solvent content is more preferably about 300 wt % or more.

(f) Inorganic Fine Particle

In the foregoing pages, the constituent components of a solid polymer electrolyte produced from the thermopolymerizable composition of the present invention are described one by one, however, as long as the object of the present invention is not inhibited, other additives may also be added.

For example, the electrolyte may be a composite electrolyte having added thereto inorganic fine particle of various types. By doing so, not only the strength and the film uniformity are improved but also the ionic conductivity and mobility can be increased without impairing the effect of improving the strength, because fine holes are generated between the inorganic fine particle and the polymer and in particular, when a solvent is added, a free electrolytic solution disperses into the holes, namely, within the composite electrolyte. Furthermore, by adding inorganic fine particle, the viscosity of the polymerizable composition increases and this gives an effect of preventing separation between polymer and organic solvent even when the polymer has insufficient compatibility with the solvent.

The inorganic fine particle used is selected from electronically non-conducting and electrochemically stable particles. Those further having ionic conductivity are more preferred. Specific examples thereof include ion-conductive or electronically non-conducting ceramic-made fine particles such as $\alpha$-, $\beta$- or $\gamma$-alumina and silica.

From the standpoint of improving the strength of the composite polymer electrolyte or increasing the amount of the retentive electrolytic solution, the inorganic fine particle preferably has a secondary particle structure resulting from coagulation of primary particles. Specific examples of the inorganic fine particle having such a structure include silica ultrafine particle such as AEROSIL (produced by Nippon Aerosil K. K.), and alumina ultrafine particle. In view of stability and compounding efficiency, alumina ultrafine particle is more preferred.

For the purpose of increasing the retentive amount of electrolyte-containing solution in the electrolyte and increasing the ionic conductivity and mobility, the filler preferably has a specific surface area as large as possible. The specific surface area by BET method is preferably about 5 $m^2/g$ or more, more preferably about 50 $m^2/g$ or more.

The inorganic fine particle is not particularly limited on the size as long as it can mixed with the polymerizable composition, however, the size is, in terms of the average particle size, preferably from about 0.01 $\mu$m to about 100 $\mu$m, more preferably from about 0.01 $\mu$m to about 20 $\mu$m.

The inorganic fine particle used may have various shapes such as spherical, egg-like, cubic, rectangular, cylindrical and bar-like forms.

If the amount of the inorganic fine particle added is excessively large, there arise problems that the composite electrolyte is reduced in the strength or ionic conductivity or the film is difficult to form. Accordingly, the amount of the inorganic fine particle added is preferably about 50 wt % or less, more preferably from about 0.1 to about 30 wt %, based on the composite electrolyte.

(g) Blending Order

In manufacturing the thermopolymerizable composition, the order of adding thermopolymerization initiator and the like is not particularly limited, however, preferred examples of the order are described in the following methods.

The polymerization retarder (c) represented by formula (1) can be partially or wholly added to any of the polymerizable compound, the solvent, the electrolytic solution and the polymerizable composition prepared therefrom. However, in view of solubility, the polymerization retarder (c) is preferably added to the solvent, the electrolytic solution or the polymerizable composition.

The polymerization initiator (b) represented by formula (2) can also be added to any of the polymerizable compound, the solvent, the electrolytic solution and the polymerizable composition prepared therefrom. However, in view of storage stability and solubility, the polymerization initiator (b) is preferably added to the final polymerizable composition after all are mixed.

(B) Solid Polymer Electrolyte and Process for Manufacturing the Same (Polymerization of Thermopolymerizable Composition)

The preferred curing conditions of the thermopolymerizable composition may be determined by selecting the thermopolymerization initiator according to the desired molding temperature, the kind and curability of the polymerizable compound, and the boiling point of solvent and then referring to the temperature necessary for halving the active oxygen amount in the initiator within a predetermined time (half-life temperature). The curing temperature and the curing rate may be determined based on the half-life and activation energy of the thermopolymerization initiator. For example, the temperature necessary for the half-life of 10 hours is preferably from room temperature to about 100° C. or less, more preferably from about 40° C. to about 70° C.

Also, two or more thermopolymerization initiators different in the active oxygen amount, the activation energy or the half-life may be freely selected and used in combination. Based on these indices, the initiator and the curing conditions most suitable for the curing reaction for obtaining a solid polymer electrolyte are preferably selected.

For example, when a polymerization retarder represented by formula (1) and the thermopolymerization initiator represented by formula (2) are combined with a thermopolymerizable composition for a solid polymer electrolyte comprising an electrolyte salt and a (meth)acrylate monomer containing a urethane bond represented by formula (4) and an oxyalkylene group (see, JP-A-6-187822), the curing is attained by the heating at 60° C. for 60 minutes. After this curing, the ionic conductivity is as high as about $10^{-4}$ S/cm (at room temperature) even when a solvent is not added, and when a solvent is added, it is found that the ionic conductivity is improved to about $10^{-3}$ S/cm or more even at room temperature or a temperature lower than that. Moreover, in the case of application to devices such as battery and electric double-layer capacitor, the entire solidification of device can be simply realized by sealing the device and then heat-curing the thermopolymerizable composition previously introduced into the device.

The solid polymer electrolyte of the present invention may also be used as a composite electrolyte by compounding it with, for example, a porous polymer film of various types so as to improve the strength, obtain the film uniformity or prevent the short circuit between electrodes. In this case, depending on the kind of polymer used, the film shape or the compounding ratio, the separator after the absorption of electrolytic solution may be reduced in the ionic conductivity or deteriorated in the stability. Accordingly, the film compounded must be appropriately selected. Examples of the film compounded include polypropylene non-woven fabric and network polyolefin sheet such as polyethylene-made net. In the case of use as a separator, examples of the film include woven or non-woven fabric of polyethylene or polypropylene, non-woven fabric of glass fiber or ceramic fiber, a solid polymer electrolyte membrane, and a composite form thereof. Among these, a solid polymer electrolyte membrane and a composite form thereof are preferred because when they are used for a separator, good bonding and adhesion to the solid polymer electrolyte of the present invention can be attained.

The use embodiment of the solid polymer electrolyte of the present invention is described in greater detail below by referring to a battery and an electric double-layer capacitor.

(C) Battery and Process for Manufacturing the Same

FIG. 1 is a schematic cross section of one example of a thin-film battery as the battery according to the present invention. In the figure, 1 is positive electrode, 2 is solid polymer electrolyte, 3 is negative electrode, 4a and 4b are collector, and 5a and 5b are insulating resin sealant.

In constructing the battery of the present invention, when a metal oxide, a metal sulfide, an electrically conducting polymer or an electroactive substance (positive electroactive substance) having a high oxidation-reduction potential such as carbon material is used for the positive electrode 1, a battery having high voltage and high capacity can be obtained. Among these electroactive substances, metal oxides such as cobalt oxide, manganese oxide, vanadium oxide, nickel oxide and molybdenum oxide, and metal sulfides such as molybdenum sulfide, titanium sulfide and vanadium sulfide are preferred because high filling density and high volume capacity density can be attained. In view of high capacity and high voltage, manganese oxide, nickel oxide and cobalt oxide are more preferred.

In this case, the method for producing the metal oxide or metal sulfide is not particularly limited and these may be produced by a general electrolytic method or heating method described, for example, in Denki Kagaku (Electrochemistry), Vol. 22, page 574 (1954). In the case of a lithium battery, the electroactive substance is preferably used in the state such that Li element is intercalated (compounded) in the metal oxide or metal sulfide, for example, in the form of $Li_xCoO_2$ and $Li_xMnO_2$. The method for intercalating Li element as such is not particularly limited and for example, a method of electrochemically intercalating Li ion may be used or the intercalation may be attained by mixing a salt such as $Li_2CO_3$ with a metal oxide and then heat-treating the mixture as described in U.S. Pat. No. 4,357,215.

In view of easy formation of soft and thin film, an electrically conducting polymer is preferred. Examples of the electrically conducting polymer include polyaniline, polyacetylene and derivatives thereof, poly-p-phenylene and derivatives thereof, polypyrrole and derivatives thereof, polythienylene and derivatives thereof, polypyridinediyl and derivatives thereof, polyisothianaphthenylene and derivatives thereof, polyfurylene and derivatives thereof, polyselenophene and derivatives thereof, and polyarylene vinylene and derivatives thereof, such as poly-p-phenylene vinylene, polythienylene vinylene, polyfurylene vinylene, polynaphthenylene vinylene, polyselenophene vinylene and polypyridinediyl vinylene. Among these, preferred are organic solvent-soluble polyaniline derivatives, polythienylene derivatives, poly-p-phenylene vinylene derivatives and polythienylene vinylene derivatives.

As the negative electroactive substance used for the negative electrode 3 of the battery of the present invention, materials having a low oxidation-reduction potential and using the above-described alkali metal ion such as alkali metal, alkali metal alloy, carbon material, metal oxide or metal chalcogenide, as the carrier are preferred because a high-voltage and high-capacity battery can be obtained. Among these negative electroactive substances, lithium metals and lithium alloys such as lithium/aluminum alloy, lithium/lead alloy and lithium/antimony alloy are preferred because of the lowest oxidation-reduction potential. Also, carbon materials having occluded thereinto lithium ion exhibit a low oxidation-reduction potential and these are advantageously stable and safe. Examples of the material capable of occluding or releasing lithium ion include inorganic compounds such as tin oxide, natural graphite, artificial graphite, graphite produced by the vapor phase method, petroleum coke, coal coke, pitch-type carbon, polyacene, and furalene such as C60 and C70.

For the collector 4a and 4b, a material having electronic conduction, electrochemical corrosion resistance and a surface area as large as possible is preferably used. Examples of the material include various metals and sintered body thereof, electronically conducting polymers and carbon sheet.

One example of the method for producing the battery of the present invention is described below.

A positive electrode 1 and a negative electrode 3 are placed in a structure body for constructing a battery, including collectors 4a and 4b, so as not to come into contact with each other but to interpose a solid polymer electrolyte film 2 obtained from the thermopolymerizable composition of the present invention. Then, an electrolytic solution is injected and impregnated to obtain a battery containing a solid polymer electrolyte. When a thermopolymerizable composition is injected in place of the electrolytic solution, the polymerizable composition is cured by heating and completely solidified to obtain a battery containing a solid polymer electrolyte uniformly contacting with the electrodes. Thereafter, the battery is sealed with an insulating resin 5a and 5b such as polyolefin resin or epoxy resin.

A completely solidified battery may also be obtained by injecting and impregnating the thermopolymerizable composition of the present invention between electrodes fabricated so as not to come into contact with each other by interposing a separator between the positive electrode and the negative electrode, and curing the composition by heating.

A method of impregnating an electrolytic solution or the thermopolymerizable composition into the positive electrode and/or the negative electrode, coating the thermopolymerizable composition of the present invention on either one of the electrodes to have a uniform thickness, and then thermopolymerizing the composition by the above-described method to form a solid polymer electrolyte film having a uniform thickness on the electrode, may also be used. A battery can be obtained by subsequently attaching the other side electrode onto the solid polymer electrolyte layer, placing the members together in a structure body for constructing a battery, and sealing the device obtained with an insulating resin such as polyolefin resin or epoxy resin.

(D) Electric Double-Layer Capacitor and Process for Manufacturing the Same

The electric double-layer capacitor of the present invention is described below.

According to the present invention, an electric double-layer capacitor having a high output voltage, a large takeout current and excellent property with respect to the processability, life and reliability can be obtained by using the solid polymer electrolyte of the present invention.

Figure 2:
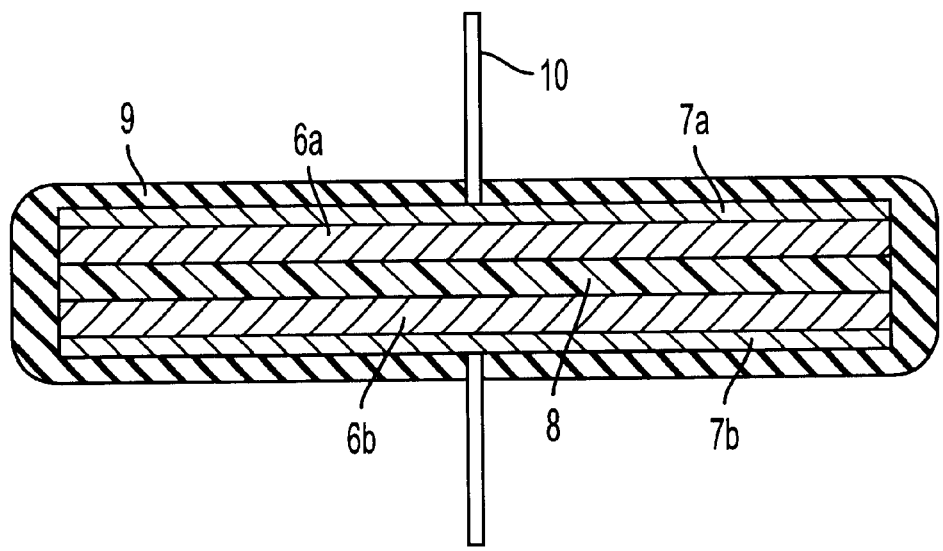
FIG. 2 shows a schematic cross-sectional view of one example of the electric double-layer capacitor according to the present invention.

FIG. 2 shows a schematic cross-sectional view of one example of an electric double-layer capacitor of the present invention. This example is a thin cell having a size of about 1 cm×1 cm and a thickness of about 0.5 mm, where 7a and 7b are collectors, a pair of polarizable electrodes 6a and 6b are disposed in the inner side of respective collectors, a solid polymer electrolyte film 8 is disposed between electrodes, 9 is an insulating resin sealant and 10 is a lead wire.

The polarizable electrodes 6a and 6b are not particularly limited as long as they are an electrode comprising a polarizable material such as carbon material and having a large specific surface area. As the specific surface area is larger, the capacity of the electric double layer is advantageously larger. Examples of such a material include carbon black materials such as furnace black, thermal black (including acetylene black) and channel black, active carbon materials such as coco shell carbon, natural graphite, artificial graphite, so-called pyrolytic graphite produced by the vapor phase method, polyacene, C60 and C70.

For the collectors 7a and 7b, a material having electronic conduction, electrochemical corrosion resistance and a specific surface area as large as possible is preferably used. Examples thereof include various metals and sintered body thereof, electronically conducting polymers and carbon sheet.

With respect to the shape of the electric double-layer capacitor, other than the sheet form shown in FIG. 2, a coin form or a cylinder form may be used. The cylinder-form electric double-layer capacitor is produced by rolling up a sheet laminate of polarizable electrodes and a solid polymer electrolyte into a cylinder form, placing the roll in a structure body having a cylindrical tubular form for constructing a capacitor, and sealing it.

The kind of the electrolyte salt for use in the electric double-layer capacitor of the present invention is not particularly limited and a compound containing ion intended to serve as the charge carrier may be used. However, those containing ion capable of exhibiting a large dissociation constant in the solid polymer electrolyte and readily forming polarizable electrodes and electric double layer are preferred. Examples of such a compound include quaternary ammonium salts such as $(CH_3)_4NBF_4$ and $(CH_3CH_2)_4NClO_4$; transition metal salts such as $AgClO_4$; quaternary phosphonium salts such as $(CH_3)_4PBF_4$; alkali metal salts such as $LiCF3SO_3$, $LiPF_6$, $LiClO_4$, $LiI$, $LiBF_4$, $LiSCN$, $LiAsF_6$, $Li(CF_3SO_2)_2$, $NaCF_3SO_3$, $NaPF_6$, $NaClO_4$, $NaI$, $NaBF_4$, $NaAsF6$, $KCF_3SO_3$, $KPF_6$ and $KI$; organic acids and salts thereof such as p-toluenesulfonic acid; and inorganic acids such as hydrochloric acid and sulfuric acid. Among these, from the standpoint that high output voltage can be taken out and the dissociation constant is large, quaternary ammonium salts, quaternary phosphonium salts and alkali metal salts are preferred. Among quaternary ammonium salts, those where the substituents on nitrogen of the ammonium ion are different, such as $(CH_3CH_2)(CH_3CH_2CH_2CH_2)_3NBF_4$, are preferred because the solubility or dissociation constant in the solid polymer electrolyte is large.

One example of the method for producing the electric double-layer capacitor of the present invention is described below.

Two polarizable electrodes 6a and 6b are placed in a structure body for constructing an electric double-layer capacitor, including collectors 7a and 7b, so as not to come into contact with each other but to interpose a solid polymer electrolyte film 8 obtained from the thermoolymerizable composition of the present invention. Subsequently, an electrolytic solution or polymerizable composition is injected thereinto and then the device obtained is sealed by an insulating resin 9 such as polyolefin resin or epoxy resin, whereby an intended electric double-layer capacitor can be obtained. In the case when a thermopolymerizable composition is injected, the composition may be polymerized by heating and thereby an electric double-layer capacitor completely solidified by the solid polymer electrolyte of the present invention can be obtained.

The structure body for constructing an electric double-layer capacitor or the support may be a metal such as SUS, polypropylene, aluminum-laminated heat fusing resin, polyimide, ethylene-vinyl alcohol copolymer or a ceramic material such as electrically conducting or insulating glass, however, the present invention is by no means limited to these materials. The shape thereof may be a cylinder form, a box form, a sheet form or any other form.

BEST MODE FOR CARRYING OUT THE INVENTION

The present invention is described in greater detail below by referring to the representative Examples, however, these are set forth merely for the purpose of illustration and the present invention should not be construed as being limited thereto.

EXAMPLE 1

Synthesis of Thermopolymerizable Compound (Compound 3)

Compound 1 as a glycerin ester and Compound 2 as a methacrylate having an isocyanate group were reacted according to the following reaction scheme to obtain a thermopolymerizable compound (Compound 3) through the procedure described below.

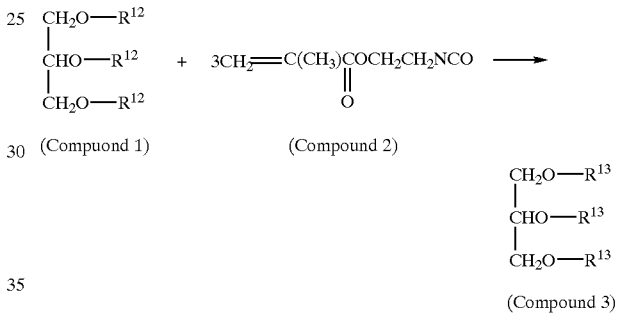

wherein $R^{12}$ is

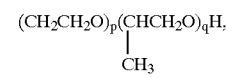

and

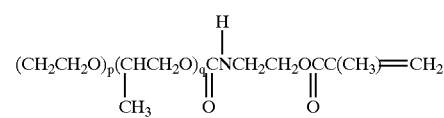

A mixture of Compound 1 (KOH value 34.0 mg/g, p/q=7/3) (50.0 g) and dimethyl carbonate (20 g) having a low water content was azeotropically boiled under reduced pressure at 80° C. and a vacuum degree of 3 mmHg to distill off water together with dimethyl carbonate, thereby obtaining Compound 1 (50 g) having a low water content. The water content of Compound 1 was measured by the Karl-Fischer's method and found to be 30 ppm.

The thus-obtained Compound 1 (50 g) having a low water content and Compound 2 (4.6 g) were dissolved in well purified tetrahydrofuran (THF) (100 ml) in a nitrogen atmosphere and thereto, dibutyltin dilaurate (0.44 g) was added. The resulting solution was reacted at 15° C. for about 25 hours to obtain a colorless viscous liquid. From $^1$H-NMR and $^{13}$C-NMR, it was found that Compound 1 and Compound 2 were reacted at 1:3, and from the infrared absorption spectrum, the absorption of isocyanate group disappeared and a urethane bond was produced, revealing that Compound 3 was produced.

EXAMPLE 2

Preparation of Thermopolymerizable Composition

Diethyl carbonate (DEC) (5.0 g) with Compound 3 (1.0 g), ethylene carbonate (EC) (2.0 g), LiPF$_6$ (1.00 g), 2,4-diphenyl-4-methyl-1-pentene (polymerization retarder, NOFMER MSD, trade name, produced by NOF Corporation) (1.8 mg) and t-hexylperoxy pivalate (PERHEXYL PV, trade name, produced by NOF Corporation) (18 mg) as a thermopolymerization initiator were well mixed in an argon atmosphere to obtain a polymerizable composition for solid polymer electrolyte.

This composition was interposed between two sheets of calcium fluoride plates (diameter: 2 mm, thickness: 1 mm) in an argon atmosphere to prepare a cell for the measurement of infrared absorption spectrum. At this time, in order to secure a clearance, a 5 μm-thick polyimide film formwork was used. This cell was set to a hot stage with a heat regulator (HOT STAGE Model FP82, manufactured by Metler) and while heating the cell using an FT-IR apparatus (Model BALOER 3, manufactured by Nippon Bunko K. K.), the infrared absorption spectrum was measured. From the peak area corresponding to the unsaturated bond in the vicinity of 1,630 cm$^{-1}$, the residual double bond was quantified. As a result, after heating at 60° C. for 60 minutes, the residual double bond was reduced to the detection limit of 0.1% or less.

When this composition (1 g) after the preparation was left standing at 25° C. in an argon atmosphere, the viscosity abruptly increased after 15 hours and the composition as a whole lost flowability to solidify.

EXAMPLE 3

Preparation of Thermopolymerizable Composition

Diethyl carbonate (DEC) (5.0 g) with Compound 3 (1.0 g), ethylene carbonate (EC) (2.0 g), LiPF$_6$ (1.00 g), 2,4-di (2-methylphenyl)-4-methyl-1-hexene (1.8 mg) and t-hexylperoxy pivalate (PERHEXYL PV, trade name, produced by NOF Corporation) (45 mg) as a thermopolymerization initiator were well mixed in an argon atmosphere to obtain a polymerizable composition for solid polymer electrolyte.

This composition was interposed between two sheets of calcium fluoride plates (diameter: 2 mm, thickness: 1 mm) in an argon atmosphere to prepare a cell for the measurement of infrared absorption spectrum. At this time, in order to secure a clearance, a 5 μm-thick polyimide film formwork was used. This cell was set to a hot stage with a heat regulator (HOT STAGE Model FP82, manufactured by Metler) and while heating the cell using an FT-IR apparatus (Model BALOER 3, manufactured by Nippon Bunko K. K.), the infrared absorption spectrum was measured. From the peak area corresponding to the unsaturated bond in the vicinity of 1,630 cm$^{-1}$, the residual double bond was quantified. As a result, after heating at 60° C. for 60 minutes, the residual double bond was reduced to the detection limit of 0.1% or less.

When this composition (1 g) after the preparation was left standing at 25° C. in an argon atmosphere, the viscosity abruptly increased after 10 hours and the composition as a whole lost flowability and solidified.

EXAMPLE 4

Preparation of Solid Polymer Electrolyte Film A

Compound 3 (1.0 g), propylene carbonate (PC) (0.8 g), EC (2.2 g), LiPF$_6$ (0.45 g), polymerization retarder NOFMER MSD (2.5 mg) and t-hexylperoxy pivalate (PERHEXYL PV, trade name, produced by NOF Corporation) (23 mg) as a thermopolymerization initiator were well mixed in an argon atmosphere to obtain a polymerizable composition for solid polymer electrolyte.

To the thus-prepared polymerizable composition for solid polymer electrolyte, aluminum oxide C (produced by Nippon Aerosil K. K., average particle size of secondary particles: about 0.2 μm, specific surface area: about 100 m$^2$/g) (0.20 g) as inorganic fine particle was added and mixed while stirring for 5 minutes to obtain milky-white Polymerizable Composition A for solid polymer electrolyte, containing inorganic fine particles.

Composition A was coated on a polypropylene (PP) film in an argon atmosphere to have a thickness of 30 μm and another PP film was covered thereon. This pair of PP films was interposed between two 1.1 mm-thick glass plates. This pair of glass plates was heated at 60° C. for 60 minutes and then the glass plate was separated from each PP film. As a result, Solid Polymer Electrolyte Film A was obtained as a thin white turbid free standing film having a thickness of 30 μm.

The ionic conductivity of this film was measured at 25° C. and −10° C. by an impedance method and found to be 3.5×10$^{-3}$ S/cm and 0.8×10$^{-3}$ S/cm, respectively.

When Composition A (1 g) after the preparation was left standing at 25° C. in an argon atmosphere, the viscosity abruptly increased after 10 hours and the composition as a whole lost flowability and solidified.

EXAMPLE 5

Preparation of Solid Polymer Electrolyte Film B

Compound 3 (1.0 g), DEC (1.5 g), EC (1.5 g), LiPF$_6$ (0.45 g), polymerization retarder NOFMER MSD (0.9 mg) and bis(4-t-butylcyclohexyl)peroxy dicarbonate (PEROYL TCP, trade name, produced by NOF Corporation) (9 mg) as a thermopolymerization initiator were well mixed in an argon atmosphere to obtain a polymerizable composition for solid polymer electrolyte.

To the thus-prepared polymerizable composition for solid polymer electrolyte, aluminum oxide C (produced by Nippon Aerosil K. K., average particle size of secondary particles: about 0.2 μm, specific surface area: about 100 m$^2$/g) (0.20 g) as inorganic fine particle was added and mixed while stirring for 5 minutes to obtain milky-white Polymerizable Composition B for solid polymer electrolyte, containing inorganic fine particles.

Composition B was cured by heating at 60° C. for 60 minutes in the same manner as in Example 4 to obtain Solid Polymer Electrolyte Film B as a thin white turbid free standing film having a thickness of 30 μm.

The ionic conductivity of this film was measured at 25° C. and −10° C. by an impedance method and found to be 3.2×10$^{-3}$ S/cm and 1.0×10$^{-3}$ S/cm, respectively.

When Composition A (1 g) after the preparation was left standing at 25° C. in an argon atmosphere, the viscosity abruptly increased after 12 hours and the composition as a whole lost flowability and solidified.

EXAMPLE 6

Preparation of Solid Polymer Electrolyte Film C

Compound 3 (1.0 g), DEC (7.0 g), EC (3.0 g), LiPF$_6$ (1.5 g), polymerization retarder NOFMER MSD (2.5 mg) and 1,1,3,3-tetramethylbutylperoxy-2-ethyl hexanoate (thermopolymerization initiator, PEROCTA O, trade name, produced by NOF Corporation) (25 mg) were well mixed in an argon atmosphere to obtain Polymerizable Composition C for solid polymer electrolyte.

Composition C was cured by heating at 60° C. for 120 minutes in the same manner as in Example 4 to obtain 100 μm-thick transparent Solid Polymer Electrolyte Film C.

The ionic conductivity of this film was measured at 25° C. and −10° C. by an impedance method and found to be $5.0 \times 10^{-3}$ S/cm and $1.8 \times 10^{-3}$ S/cm, respectively.

When Composition C (1 g) after the preparation was left standing at 25° C. in an argon atmosphere, the viscosity abruptly increased after 24 hours and the composition as a whole lost flowability and solidified.

COMPARATIVE EXAMPLE 1

Preparation of Solid Polymer Electrolyte Film C'

Polymerizable Composition C' for solid polymer electrolyte was obtained in the same manner as in Example 6 except for not using polymerization retarder NOFMER MSD.

Composition C' was cured by heating at 60° C. for 120 minutes in the same manner as in Example 4 to obtain 100 μm-thick transparent Solid Polymer Electrolyte Film C'.

The ionic conductivity of this film was measured at 25° C. and −10° C. by an impedance method and found to be $5.1 \times 10^{-3}$ S/cm and $1.8 \times 10^{-3}$ S/cm, respectively.

When Composition C' (1 g) after the preparation was left standing at 25° C. in an argon atmosphere, the viscosity abruptly increased after 1 hour and the composition as a whole lost flowability and solidified.

EXAMPLE 7

Preparation of Solid Polymer Electrolyte Film D

Compound 3 (1.0 g), DEC (7.0 g), EC (3.0 g), $LiPF_6$ (1.5 g), 2,4-di(4-methylphenyl)-4-methyl-1-pentene (1.2 mg) and 1,1,3,3-tetramethylbutylperoxy-2-ethyl hexanoate (thermopolymerization initiator, PEROCTA O, trade name, produced by NOF Corporation) (25 mg) were well mixed in an argon atmosphere to obtain Polymerizable Composition D for solid polymer electrolyte.

Composition D was cured by heating at 60° C. for 120 minutes in the same manner as in Example 4 to obtain 100 μm-thick transparent Solid Polymer Electrolyte Film C.

The ionic conductivity of this film was measured at 25° C. and −10° C. by an impedance method and found to be $5.0 \times 10^{-3}$ S/cm and $1.8 \times 10^{-3}$ S/cm, respectively.

When Composition D (1 g) after the preparation was left standing at 25° C. in an argon atmosphere, the viscosity abruptly increased after 12 hours and the composition as a whole lost flowability and solidified.

EXAMPLE 8

Production of Lithium Cobaltate Positive Electrode $Li_2CO_3$ (11 g) and $Co_3O_4$ (24 g) were thoroughly mixed and the mixture was heated in an oxygen atmosphere at 800° C. for 24 hours and pulverized to obtain $LiCoO_2$ powder. The $LiCoO_2$ powder obtained, acetylene black and polyvinylidene fluoride were mixed at a weight ratio of 8:1:1 and thereto, an excess N-methylpyrrolidone solution was added to obtain a gel composition.

This composition was coated and formed under pressure on a 50 μm-thick aluminum foil to have a thickness of 75 μm and thereby a lithium cobaltate positive electrode sheet was obtained. This sheet was cut into a 36 mm square and used as the positive electrode for battery.

EXAMPLE 9

Production of Graphite Negative Electrode

To a 8.6:0.4:1.0 (by weight) mixture of MCMB graphite (produced by Osaka Gas Co., Ltd.), vapor phase graphite fiber (produced by Showa Denko K. K., average fiber diameter: 0.3 μm, average fiber length: 2.0 μm, heat-treated product at 2,700° C.) and polyvinylidene fluoride, an excess N-methylpyrrolidone solution was added to obtain a gel composition. This composition was coated and formed under pressure on a 100 μm-thick copper foil to have a thickness of 85 μm and thereby a graphite negative electrode sheet was obtained. This sheet was cut into a 40 mm square and used as the negative electrode for battery.

EXAMPLE 10

Production of Entire Solid Li Ion Secondary Battery

Within a glove box in an argon atmosphere, the sheet-like graphite negative electrode (40 mm square) produced in Example 9 was allowed to stand in Polymerizable Composition C prepared in Example 6 and impregnated with the composition. Thereafter, unnecessary Composition C on the negative electrode was wiped off by KIM WIPE (trade name, produced by Kimberly-Clark Corp.). On this negative electrode, Polymerizable Composition B prepared in Example 5 was coated using a 1-mil applicator to have a thickness of 25 μm. The resulting coating was covered with PP film and further with a 0.7 mm-thick glass plate and heated at 60° C. for 30 minutes on a hot plate with a temperature regulator to form a solid polymer electrolyte layer on the negative electrode.

Then, the PP film and the glass plate were peeled off and the resulting composite negative electrode was attached to the lithium cobaltate positive electrode produced in Example 8 having previously impregnated therein Composition C prepared in Example 6. These electrodes were placed in a bag (armor body) made of a PP/Al/PET three-layer laminate and heated at 60° C. for 120 minutes while applying a pressure from both surfaces using 1.1 mm-thick glass plates to obtain a battery having compounded between electrodes thereof a solid polymer electrolyte.

This battery was charged and discharged at 25° C. and −10° C. at a working voltage of from 2.75 to 4.1 V and an electric current of 7 mA, as a result, the maximum discharge capacity was 30.0 mAh and 24.3 mAh, respectively. At this time, the charge-discharge coulombic efficiency was almost 100% and a reaction current originated from uncured product or initiator decomposition product was not observed.

The battery was repeatedly charged and discharged at 25° C., a working voltage of from 2.75 to 4.1 V, a charge current of 7 mA and a discharge current of 35 mA, then, the maximum discharge capacity was 28.5 mAh and the capacity was 70% or more of the initial capacity even after working in excess of 300 cycles, thus, prevented from extreme reduction.

EXAMPLE 11

Production of Entire Solid Li Ion Secondary Battery

Within a glove box in an argon atmosphere, the sheet-like graphite negative electrode produced in Example 9, the sheet-like lithium cobaltate positive electrode produced in Example 8 and a 42 mm-square polyolefin microporous film were allowed to stand in Polymerizable Composition C prepared in Example 6 and impregnated with the composition. Thereafter, the negative electrode and the positive electrode were attached to each other through the porous film such that the porous film slightly protruded from respective edges (4 sides) of the positive and negative electrodes. These electrodes were placed in a bag (armor body) made of a PP/Al/PET three-layer laminate and heated at 60° C. for 120 minutes while applying a pressure from both surfaces using 1.1 mm-thick glass plates to obtain an entire solid battery having compounded between electrodes thereof a solid polymer electrolyte.

This battery was charged and discharged at 25° C. and −10° C. at a working voltage of from 2.75 to 4.1 V and an electric current of 7 mA, as a result, the maximum discharge capacity was 29.5 mAh and 24.8 mAh, respectively. At this time, the charge-discharge coulombic efficiency was almost 100% and a reaction current originated from uncured product or initiator decomposition product was not observed.

The battery was repeatedly charged and discharged at 25° C., a working voltage of from 2.75 to 4.1 V, a charge current of 7 mA and a discharge current of 35 mA, then, the maximum discharge capacity was 28.0 mAh and the capacity was 80% or more of the initial capacity even after working in excess of 300 cycles, thus, prevented from extreme reduction.

EXAMPLE 12

Production of Entire Solid Li Ion Secondary Battery

Within a glove box in an argon atmosphere, the sheet-like graphite negative electrode produced in Example 9 and the sheet-like lithium cobaltate positive electrode produced in Example 8 were allowed to stand in Polymerizable Composition C prepared in Example 6 and impregnated with the composition. Thereafter, the negative electrode and the positive electrode were attached to each other through Solid Polymer Electrolyte A (cut into 42 mm square) produced in Example 4 such that the Solid Polymer Electrolyte Film A slightly protruded from respective edges (4 sides) of the positive and negative electrodes. These electrodes were placed in a bag (armor body) made of a PP/Al/PET three-layer laminate and heated at 60° C. for 120 minutes while applying a pressure from both surfaces using 1.1 mm-thick glass plates to obtain an entire solid battery having compounded between electrodes thereof a solid polymer electrolyte film.

This battery was charged and discharged at 25° C. and −10° C. at a working voltage of from 2.75 to 4.1 V and an electric current of 7 mA, as a result, the maximum discharge capacity was 30.0 mAh and 23.8 mAh, respectively. At this time, the charge-discharge coulombic efficiency was almost 100% and a reaction current originated from uncured product or initiator decomposition product was not observed.

The battery was repeatedly charged and discharged at 25° C., a working voltage of from 2.75 to 4.1 V, a charge current of 7 mA and a discharge current of 35 mA, then, the maximum discharge capacity was 27.9 mAh and the capacity was 75% or more of the initial capacity even after working in excess of 300 cycles, thus, prevented from extreme reduction.

EXAMPLE 13

Production of Li Ion Secondary Battery

Within a glove box in an argon atmosphere, the sheet-like graphite negative electrode (40 mm square) produced in Example 9 was allowed to stand in a 7:3 (by volume) EMC (ethyl methyl carbonate) and EC mixed electrolytic solution containing 1 mol of $LiPF_6$ and impregnated with the electrolytic solution. Thereafter, unnecessary electrolytic solution on the negative electrode was wiped off by KIM WIPE (trade name, produced by Kimberly-Clark Corp.). On this negative electrode, Polymerizable Composition B prepared in Example 5 was coated using a 1-mil applicator to have a thickness of 25 $\mu$m. The resulting coating was covered with PP film and further with a 0.7 mm-thick glass plate and heated at 60° C. for 30 minutes on a hot plate with a temperature regulator to form a solid polymer electrolyte layer on the negative electrode.

Then, the PP film and the glass plate were peeled off and the resulting composite negative electrode was attached to the lithium cobaltate positive electrode produced in Example 8 having previously impregnated therein Composition C prepared in Example 6. These electrodes were placed in a bag (armor body) made of a PP/Al/PET three-layer laminate and heated at 60° C. for 120 minutes while applying a pressure from both surfaces using 1.1 mm-thick glass plates to obtain a battery having compounded between electrodes thereof a solid polymer electrolyte.

This battery was charged and discharged at 25° C. and −10° C. at a working voltage of from 2.75 to 4.1 V and an electric current of 7 mA, as a result, the maximum discharge capacity was 30.0 mAh and 23.8 mAh, respectively. At this time, the charge-discharge coulombic efficiency was almost 100% and a reaction current originated from uncured product or initiator decomposition product was not observed.

The battery was repeatedly charged and discharged at 25° C., a working voltage of from 2.75 to 4.1 V, a charge current of 7 mA and a discharge current of 35 mA, then, the maximum discharge capacity was 27.9 mAh and the capacity was 75% or more of the initial capacity even after working in excess of 300 cycles, thus, prevented from extreme reduction.

EXAMPLE 14

Synthesis of Thermopolymerizable Compound (Compound 5)

Compound 4 as a polyether mono-ol and Compound 2 were reacted according to the following reaction scheme to obtain a thermopolymerizable compound (Compound 5) through the procedure described below.

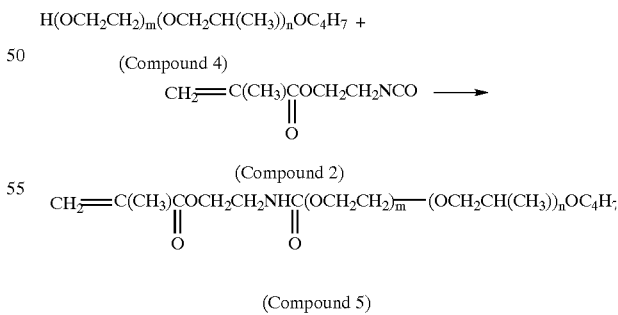

A mixture of Compound 4 (average molecular weight: 550, m/n=7/3) (57.0 g) and dimethyl carbonate (20 g) having a low water content was azeotropically boiled under reduced pressure at 80° C. and a vacuum degree of 3 mmHg to distill off water together with dimethyl carbonate, thereby obtaining Compound 4 (55 g) having a low water content. The water content of Compound 4 was measured by the Karl Fischer's method and found to be 35 ppm. The thus-obtained Compound 4 (55.0 g) having a low water content and Compound 2 (15.5 g) were dissolved in well purified THF (100 ml) in a nitrogen atmosphere and thereto, dibutyltin dilaurate (0.66 g) was added. The resulting solution was reacted at 15° C. for 25 hours to obtain a colorless viscous liquid. From $^1$H-NMR and $^{13}$C-NMR, it was found that Compound 4 and Compound 2 were reacted at 1:1, and from the infrared absorption spectrum, the absorption of isocyanate group disappeared and a urethane bond was produced, revealing that Compound 5 was produced.

EXAMPLE 15

Preparation of Solid Polymer Electrolyte E

Compound 3 (1.0 g), PC (3.0 g), triethylmethylammonium tetrafluoroborate (TEMABF$_4$) (1.0 g), polymerization retarder NOFMER MSD (2.5 mg) and PEROCTA O (produced by NOF Corporation) (25 mg) as a thermopolymerization initiator were well mixed in an argon atmosphere to obtain a polymerizable composition for solid polymer electrolyte.

To the thus-prepared polymerizable composition for solid polymer electrolyte, aluminum oxide C (produced by Nippon Aerosil K. K., average particle size of secondary particles: about 0.2 $\mu$m, specific surface area: about 100 m$^2$/g) (0.20 g) as inorganic fine particle was added and mixed while stirring for 5 minutes to obtain milky-white Polymerizable Composition E for solid polymer electrolyte, containing inorganic fine particles.

Composition E was coated on a polypropylene (PP) film in an argon atmosphere to have a thickness of 30 $\mu$m and another PP film was covered thereon. This pair of the PP films was interposed between two 1.1 mm-thick glass plates. This pair of glass plates was heated at 60° C. for 60 minutes and then the glass plate was separated from each PP film. As a result, Solid Polymer Electrolyte Film E was obtained as a thin white turbid free standing film having a thickness of 30 $\mu$m.

The ionic conductivity of this film was measured at 25° C. and −10° C. by an impedance method and found to be 7.3×10$^{-3}$ S/cm and 3.2×10$^{-3}$ S/cm, respectively.

When Composition E (1 g) after the preparation was left standing at 25° C. in an argon atmosphere, the viscosity abruptly increased after 12 hours and the composition as a whole lost flowability and solidified.

EXAMPLE 16

Preparation of Solid Polymer Electrolyte F

Compound 3 (0.2 g), Compound 5 (0.8 g), PC (7.0 g), EC (3.0 g), TEMABF$_4$ (2.4 g), polymerization retarder NOFMER MSD (1.8 mg) and thermopolymerization initiator PERHEXYL PV (produced by NOF Corporation) (18 mg) were well mixed in an argon atmosphere to obtain Polymerizable Composition F for solid polymer electrolyte.

Composition F was cured by heating at 60° C. for 120 minutes in the same manner as in Example 15 to obtain 100 $\mu$m-thick Solid Polymer Electrolyte Film F.

The ionic conductivity of this film was measured at 25° C. and −10° C. by an impedance method and found to be 10.0×10$^{-3}$ S/cm and 5.8×10$^{-3}$ S/cm, respectively.

When Composition F (1 g) after the preparation was left standing at 25° C. in an argon atmosphere, the viscosity abruptly increased after 15 hours and the composition as a whole lost flowability and solidified.

EXAMPLE 17

Production of Active carbon Electrode

To a 8.6:0.4:1.0 (by weight) mixture of steam reactivation active carbon (specific surface area: 2,010 m$^2$/g, average particle size: 8 $\mu$m, pore volume: 0.7 ml/g) as a phenol resin calcined product, vapor phase graphite fiber (produced by Showa Denko K. K., average fiber diameter: 0.3 $\mu$m, average fiber length: 2.0 $\mu$m, heat-treated product at 2,700° C.) and polyvinylidene fluoride, an excess N-methylpyrrolidone solution was added to obtain a gel composition. This composition was coated and formed under pressure on a 25 $\mu$m-thick aluminum foil to have a thickness of 150 $\mu$m and thereby an active carbon electrode sheet was obtained. This sheet was cut into a 10 mm square and vacuum dried at 100° C. for 10 hours to obtain an active carbon electrode (14.0 mg) for electric double-layer capacitor.

EXAMPLE 18

Production of Entire Solid Electric Double-Layer Capacitor

Within a glove box in an argon atmosphere, two electrodes were prepared by impregnating an active carbon electrode (14.0 mg, 10 mm square) produced in Example 17 with Composition F prepared in Example 16. Then, these two electrodes were attached to each other through Solid Polymer Electrolyte Film F produced in Example 16. Furthermore, an Al foil collector (thickness: 50 $\mu$m, size: 1 cm×1 cm) joined with an electrode lead wire was attached to each electrode. Thereafter, the capacitor edge parts were sealed with epoxy resin and heated at 60° C. for 120 minutes to produce an electric double-layer capacitor shown in FIG. 2.

This capacitor was charged and discharged at 25° C. and −10° C. at a working voltage of from 0 to 2.5 V and an electric current of 0.2 mA, as a result, the maximum discharge capacity was 430 mF and 322 mF, respectively. When the capacitor was charged and discharged at 25° C. and 1.0 mA, the maximum capacity was 408 mF and the capacity was scarcely changed even after charging and discharging were subsequently repeated 100 times.

EXAMPLE 19

Synthesis of Compound 6

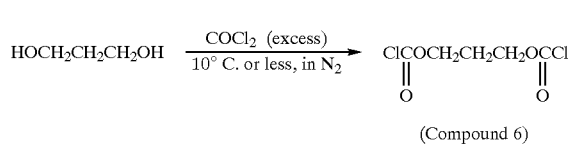

(Compound 6)

According to the scheme shown above, 1,3-propanediol was blown into an excess phosgene gas by an ordinary method at 10° C. or less in nitrogen and reacted for about 5 hours to synthesize Compound 6. The compound was identified by GC-MS (gas chromatography-mass spectroscopy).

EXAMPLE 20

Oligomerization of Compound 6 (Synthesis of Compound 7)

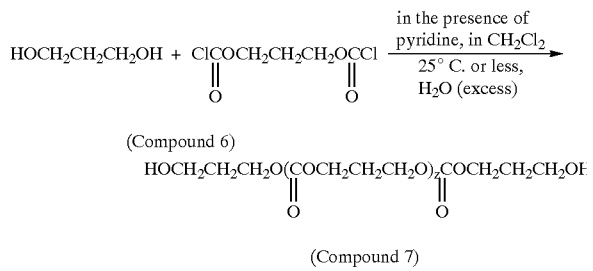

According to the scheme shown above, Compound 6 synthesized in Example 19 and 1,3-propanediol were reacted at 25° C. or less in dichloromethane for 6 hours in the presence of pyridine by an ordinary method, and thereto excess water was added to convert the remaining chloroformate terminal into hydroxyl group and thereby synthesize oligo carbonate having a hydroxyl group at both terminals (Compound 7).

The weight average molecular weight (Mw) and the average repetition number z determined by GPC analysis (gel permeation chromatography) were as follows.

Mw: up to about 1,200, z: up to about 10.

EXAMPLE 21

Synthesis of polymerizable Compound 8

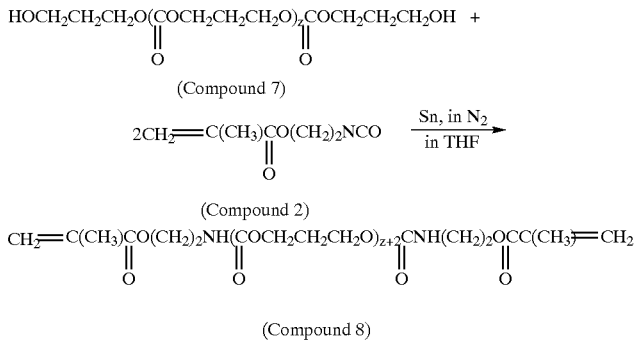

Compound 7 (average molecular weight: 1,200) (60.0 g) and Compound 2 (15.5 g) were dissolved in well purified THF (200 ml) in a nitrogen atmosphere and thereto dibutyltin dilaurate (0.44 g) was added and reacted at 25° C. for about 15 hours to obtain a colorless product. From the results of $^1$H-NMR, IR and elemental analysis thereof, it was found that Compound 7 and Compound 2 were reacted at 1:2, the isocyanate group of Compound 2 disappeared and a urethane bond was produced, revealing that Compound 8 was produced.

EXAMPLE 22

Preparation of Solid Polymer Electrolyte Film G

Polymerizable Compound 8 (1.0 g), DEC (7.0 g), EC (3.0 g), LiPF$_6$ (1.5 g), polymerization retarder NOFMER MSD (15 mg) and thermopolymerization initiator PERHEXYL PV (produced by NOF Corporation) (25 mg) were well mixed in an argon atmosphere to obtain Polymerizable Composition G for solid polymer electrolyte.

Composition G was cured by heating at 60° C. for 120 minutes in the same manner as in Example 4 to obtain 100 μm-thick Solid Polymer Electrolyte Film G.

The ionic conductivity of this film was measured at 25° C. and −10° C. by an impedance method and found to be 5.3×10$^{-3}$ S/cm and 2.0×10$^{-3}$ S/cm, respectively.

When Composition G (1 g) after the preparation was left standing at 25° C. in an argon atmosphere, the viscosity abruptly increased after 30 hours and the composition as a whole lost flowability and solidified.

COMPARATIVE EXAMPLE 2

Preparation of Solid Polymer Electrolyte Film G'

Polymerizable Composition G' for solid polymer electrolyte was obtained in the same manner as in Example 22 except for not using polymerization retarder NOFMER MSD.

Composition G' was cured by heating at 60° C. for 120 minutes in the same manner as in Example 4 to obtain 100 μm-thick transparent Solid Polymer Electrolyte Film G'.

The ionic conductivity of this film was measured at 25° C. and −10° C. by an impedance method and found to be 5.1×10$^{-3}$ S/cm and 1.6×10$^{-3}$ S/cm, respectively.

When Composition G' (1 g) after the preparation was left standing at 25° C. in an argon atmosphere, the viscosity abruptly increased after 30 minutes and the composition as a whole lost flowability and solidified.

EXAMPLE 23

Preparation of Solid Polymer Electrolyte Film H

Polymerizable Compound 8 (1.0 g), DEC (7.0 g), EC (3.0 g), LiPF$_6$ (1.5 g), 2,4-di(4-bromophenyl)-4-methyl-1-pentene (2.2 mg) and thermopolymerization initiator PERHEXYL PV (produced by NOF Corporation) (50 mg) were well mixed in an argon atmosphere to obtain Polymerizable Composition H for solid polymer electrolyte.

Composition H was cured by heating at 60° C. for 120 minutes in the same manner as in Example 4 to obtain 100 μm-thick Solid Polymer Electrolyte Film H.

The ionic conductivity of this film was measured at 25° C. and −10° C. by an impedance method and found to be 5.3×10$^{-3}$ S/cm and 2.0×10$^{-3}$ S/cm, respectively.

When Composition H (1 g) after the preparation was left standing at 25° C. in an argon atmosphere, the viscosity abruptly increased after 8 hours and the composition as a whole lost flowability and solidified.

EXAMPLE 24

Production of Entire Solid Li Ion Secondary Battery

Within a glove box in an argon atmosphere, the sheet-like graphite negative electrode produced in Example 9, the sheet-like lithium cobaltate positive electrode produced in Example 8 and a 38 mm-square polyolefin microporous film were allowed to stand in Polymerizable Composition G prepared in Example 22 and impregnated with the composition. Thereafter, the negative electrode and the positive electrode were attached to each other through the porous film such that the porous film slightly protruded from respective edges (4 sides) of the positive electrode. These electrodes were placed in a bag (armor body) made of a PP/Al/PET three-layer laminate and heated at 60° C. for 2 hours while applying a pressure from both surfaces using 1.1 mm-thick glass plates to obtain a battery having compounded between electrodes thereof a solid polymer electrolyte.

This battery was charged and discharged at 25° C. and −10° C. at a working voltage of from 2.75 to 4.1 V and an electric current of 7 mA, as a result, the maximum discharge capacity was 32 mAh and 28 mAh, respectively. At this time, the electric current at the charging and discharging was monitored and other than the charge and discharge current, a reaction current originated from uncured product or initiator decomposition product was not observed. The battery was repeatedly charged and discharged at 25° C., a working voltage of from 2.75 to 4.1 V, a charge current of 7 mA and a discharge current of 35 mA, then, the maximum discharge capacity was 31 mAh and the capacity was 85% or more of the initial capacity even after working in excess of 300 cycles, thus, prevented from extreme reduction.

INDUSTRIAL APPLICABILITY

The thermopolymerizable composition for solid polymer electrolyte of the present invention has high electrochemical stability in the current properties, cyclability and the like, and when used in combination with a thermopolymerizable initiator having high polymerization initiating ability, a specific polymerizable compound having very excellent polymerizability and a polymerization retarder having high polymerization inhibiting effect, ensures excellent curability and storage stability without adversely affecting the stability of battery or electric double-layer capacitor.

The solid polymer electrolyte of the present invention comprises a polymer having a cross-linked and/or side chain group easily obtained from the above-described thermopolymerizable composition having excellent storage stability and an electrolyte, so that the solid polymer electrolyte can have high ionic conductance and good stability with reduced residual double bond or residual side product.

The battery of the present invention uses the above-described solid polymer electrolyte, so that a thin film can be easily formed, the compounding with each element of positive electrode, negative electrode and/or separator is facilitated, high-capacity and high current working is available, and long life and high reliability are ensured.

Furthermore, the battery of the present invention can work as an entire solid-state battery at high capacity and high current and is favored with good cyclability, good safety and high reliability, so that the battery can be used as a power source for electrical products, such as a main power source or a backup power source of portable appliances, or as a large-sized power source for electric cars or road leveling. In addition, the battery can be easily formed into a thin film, therefore, it can be used as a paper battery such as identification card.

The electric double-layer capacitor of the present invention uses the above-described solid polymer electrolyte, so that the capacitor can have a high output voltage, a large takeout current, good processability, long life and excellent reliability.

Furthermore, the electric double-layer capacitor of the present invention is an entire solid electric double-layer capacitor which can work at high voltage, high capacity and high current and is favored with good cyclability, excellent safety and high reliability, as compared with conventional entire solid-state capacitors, so that the capacitor can be used not only as a backup power source but also as a power source for various electrical products by using it in combination with a compact battery. In addition, the electric double-layer capacitor of the present invention has excellent processability such as formation into thin film, therefore, uses other than those of conventional solid-state electric double-layer capacitors are also available.

What is claimed is:

1. A thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

2. The thermopolymerizable composition as claimed in claim 1, wherein said polymerization retarder is a compound having a structure represented by the following formula (1):

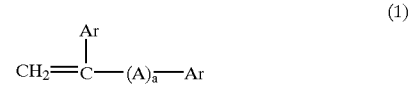

wherein A represents a linear, branched or cyclic alkylene group having from 1 to 20 carbon atoms, a linear, branched or cyclic alkenyl group having from 2 to 20 carbon atoms or a linear, branched or cyclic alkynyl group having from 2 to 10 carbon atoms; Ar represents an aryl group which may have a substituent; a represents an integer of 0 or 1; and the Ar groups may be the same or different.

3. The thermopolymerizable composition as claimed in claim 1, wherein said polymerization initiator is an organic peroxide represented by the following formula (2):

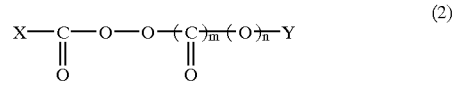

wherein X represents a linear, branched or cyclic alkyl or alkoxy group which may have a substituent; Y represents a linear, branched or cyclic alkyl group which may have a substituent; and m and n each independently represents 0 or 1, provided that the combination of (m,n)=(0,1) is excluded.

4. The thermopolymerizable composition as claimed in claim 3, wherein said organic peroxide has an active oxygen amount of from about 1 to about 1,000 ppm based on the thermopolymerizable composition.

5. The thermopolymerizable composition as claimed in claim 3, wherein said organic peroxide is selected from the group consisting of diacyl peroxides, peroxydicarbonates and peroxy esters each containing no benzene ring.

6. The thermopolymerizable composition as claimed in claim 1, wherein said thermopolymerizable compound comprises a compound having an ethylenically unsaturated polymerizable group.

7. The thermopolymerizable composition as claimed in claim 1, wherein said thermopolymerizable compound comprises a polymerizable compound having either one of the polymerizable functional groups represented by the following formulae (3) and/or (4):

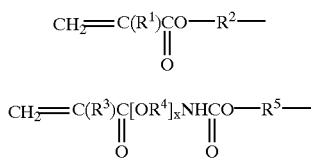

wherein $R^1$ and $R^3$ each represents hydrogen atom or an alkyl group; $R^2$ and $R^5$ each represents a divalent group containing oxyalkylene, fluorocarbon, oxyfluorocarbon or a carbonate group; $R^4$ represents a divalent group having 10 or less carbon atoms; provided that $R^2$, $R^4$ and $R^5$ each may contain a hetero atom and may have any of linear, branched and cyclic structures; x represents 0 or an integer of from 1 to 10; provided that when a plurality of polymerizable functional groups represented by formula (3) or (4) are contained in the same molecule, $R^1$, $R^2$, $R^3$, $R^4$, $R^5$ or x in each polymerizable functional group may be the same or different.

8. The thermopolymerizable composition as claimed in claim 7, which further comprises at least one organic solvent selected from the group consisting of carbonic esters, aliphatic esters, ethers, lactones, sulfoxides and amides.

9. The thermopolymerizable composition as claimed in claim 1, wherein the content of an organic solvent is from about 300 to about 1,500 wt % based on the thermopolymerizable compound.

10. The thermopolymerizable composition as claimed in claim 1, which comprises at least one kind of inorganic fine particle having an average particle size of from about 0.005 to about 100 μm.

11. The thermopolymerizable composition as claimed in claim 1, wherein said electrolyte salt is at least one selected from the group consisting of alkali metal salts, quaternary ammonium salts, quaternary phosphonium salts, transition metal salts and protonic acids.

12. The thermopolymerizable composition as claimed in claim 11, wherein at least one electrolyte salt is selected from the group consisting of $LiPF_6$, $LiBF_4$, $LiAsF_6$ and $LiN(R-SO2)_2$ (wherein R represents a perfluoroalkyl group having from 1 to 10 carbon atoms).

13. The thermopolymerizable composition as claimed in claim 2, wherein said polymerization retarder is a compound having a structure represented by formula (1) where A is a linear, branched or cyclic alkylene group having from 1 to 20 carbon atoms; Ar is a phenyl group which may have a substituent; a is an integer of 0 or 1; and the Ar groups may be the same or different.

14. The thermopolymerizable composition as claimed in claim 3, wherein said polymerization initiator is an organic peroxide, represented by formula (2) where X and Y each is a linear, branched or cyclic alkyl group which may have a substituent; and m and n each independently is 0 or 1, provided that the combination of (m,n)=(0,1) is excluded.

15. A solid polymer electrolyte obtained by thermopolymerizing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

16. A battery using a solid polymer electrolyte obtained by thermopolymerizing a thermopolymerizable composition comprising at least one thermopolymerizable compound having a polymerizable functional group and capable of forming a polymer having a cross-linked and/or side chain structure by the polymerization, at least one electrolyte salt, at least one polymerization initiator and at least one polymerization retarder having a vinyl group.

17. The battery as claimed in claim 16, wherein at least one material selected from the group consisting of lithium, lithium alloys, carbon materials capable of occluding or releasing lithium ion, inorganic compounds capable of occluding or releasing lithium ion and electrically conducting polymers capable of occluding or releasing lithium ion is used as a negative electrode of the battery.

18. The battery as claimed in claim 16, wherein at least one material selected from the group consisting of electrically conducting polymers, metal oxides, metal sulfides and carbon materials is used as a positive electrode of the battery.

* * * * *

UNITED STATES PATENT AND TRADEMARK OFFICE
CERTIFICATE OF CORRECTION

PATENT NO.     : 6,562,513 B1
DATED          : May 13, 2003
INVENTOR(S)    : Masataka Takeuchi and Shuichi Naijo It is certified that error appears in the above-identified patent and that said Letters Patent is hereby corrected as shown below:

<u>Title page,</u>
Item [73], Assignee, please delete "Showa Denki Kabushiki Kaisha" and please insert -- Showa Denko Kabushiki Kaisha --

Signed and Sealed this

Seventh Day of October, 2003

JAMES E. ROGAN
*Director of the United States Patent and Trademark Office*